US012429285B2

(12) United States Patent
Hopkins et al.

(10) Patent No.: US 12,429,285 B2
(45) Date of Patent: Sep. 30, 2025

(54) AMBIENT AIR DRYING OF SLUDGE

(71) Applicant: North Carolina State University, Raleigh, NC (US)

(72) Inventors: Christopher B. Hopkins, Raleigh, NC (US); Joseph L. Stuckey, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 690 days.

(21) Appl. No.: 17/834,605

(22) Filed: Jun. 7, 2022

(65) Prior Publication Data
US 2022/0390174 A1    Dec. 8, 2022

Related U.S. Application Data

(60) Provisional application No. 63/197,853, filed on Jun. 7, 2021.

(51) Int. Cl.
*F26B 25/22* (2006.01)
*F26B 3/04* (2006.01)
(Continued)

(52) U.S. Cl.
CPC .............. *F26B 25/22* (2013.01); *F26B 3/04* (2013.01); *F26B 21/08* (2013.01); *F26B 25/002* (2013.01); *F26B 25/04* (2013.01)

(58) Field of Classification Search
CPC ........ F26B 25/22; F26B 25/002; F26B 25/04; F26B 21/08; F26B 3/04
(Continued)

(56) References Cited

U.S. PATENT DOCUMENTS

| 708,602 A | * | 9/1902 | Welch | ............ F26B 11/028 |
| | | | | 34/500 |
| 2,657,031 A | | 10/1953 | Tomlinson et al. | |

(Continued)

FOREIGN PATENT DOCUMENTS

| CA | 2929508 A1 * | 11/2017 | ............ A63G 31/00 |
| WO | WO-2021222753 A1 * | 11/2021 | ............ A23B 4/06 |

OTHER PUBLICATIONS

Deutsch, "A Burning Answer for Manure," National Hog Farmer, Sep. 15, 2007. https://www.nationalhogfarmer.com/mag/burning_answer_manure.
(Continued)

*Primary Examiner* — Stephen M Gravini
(74) *Attorney, Agent, or Firm* — Jenkins, Taylor & Hunt, P.A.

(57) ABSTRACT

A system for reducing moisture content of a wet waste product includes a drying surface; a dispenser that deposits the wet waste product onto the drying surface; an air moving device (AMD) that induces a flow of ambient air over the wet waste product on the drying surface to produce a dried waste product from the wet waste product; a collection area that transports the dried waste product away from the drying surface; and an agitator that moves the dried waste product from the drying surface to the collection area after the dried waste product has been dried to have a predetermined moisture content. A corresponding method for reducing moisture content of the wet waste product comprises using the system to convectively dry the wet waste product to produce the dry waste product. The wet waste product can be from a swine lagoon.

28 Claims, 13 Drawing Sheets

(51) Int. Cl.
*F26B 21/08* (2006.01)
*F26B 25/00* (2006.01)
*F26B 25/04* (2006.01)

(58) Field of Classification Search
USPC .......................................................... 34/60
See application file for complete search history.

(56) References Cited

U.S. PATENT DOCUMENTS

| | | | |
|---|---|---|---|
| 3,307,270 A | | 3/1967 | Kruger et al. |
| 3,352,025 A | | 11/1967 | Brock et al. |
| 3,533,610 A | * | 10/1970 | Johnson ................... F27B 7/00 |
| | | | 252/378 R |
| 4,316,718 A | | 2/1982 | Drugge |
| 4,823,479 A | | 4/1989 | Dornier et al. |
| 5,373,647 A | | 12/1994 | Bernes et al. |
| 5,384,969 A | | 1/1995 | Troetscher et al. |
| 5,619,806 A | * | 4/1997 | Warren ................. F26B 13/105 |
| | | | 162/290 |
| 5,862,609 A | | 1/1999 | Stevens et al. |
| 5,913,590 A | | 6/1999 | Backus |
| 6,233,841 B1 | * | 5/2001 | Beach ..................... F26B 3/343 |
| | | | 34/418 |
| 6,481,232 B2 | * | 11/2002 | Faqih ................... F24F 13/222 |
| | | | 62/93 |
| 8,449,722 B2 | * | 5/2013 | Tamai ..................... D21C 5/02 |
| | | | 162/8 |
| 9,341,410 B1 | | 5/2016 | Griffin et al. |
| 10,480,856 B2 | * | 11/2019 | Massari ................... F26B 21/12 |
| 10,772,477 B2 | * | 9/2020 | Khazaieli ............. D06F 58/203 |
| 11,035,581 B1 | * | 6/2021 | Abdulrahim .......... F24F 5/0046 |
| 11,788,790 B2 | * | 10/2023 | Hopkins ............... F26B 17/023 |
| | | | 71/21 |
| 12,044,474 B1 | * | 7/2024 | Troxler ................... F26B 3/347 |
| 2002/0152631 A1 | | 10/2002 | Knoer et al. |
| 2018/0086861 A1 | | 3/2018 | Grunewald et al. |
| 2020/0085085 A1 | | 3/2020 | Reed et al. |
| 2020/0271383 A1 | | 8/2020 | Hopkins et al. |
| 2022/0390174 A1 | * | 12/2022 | Hopkins .................. F26B 3/04 |
| 2023/0040785 A1 | * | 2/2023 | Bowden ................. A23B 7/157 |

OTHER PUBLICATIONS

Notice of Publication corresponding to U.S. Appl. No. 16/797,742 dated Aug. 27, 2020.
Restriction Requirement corresponding to U.S. Appl. No. 16/797,742 dated Jun. 15, 2021.
Office Action corresponding to U.S. Appl. No. 16/797,742 dated Nov. 16, 2021.
Final Office Action corresponding to U.S. Appl. No. 16/797,742 dated Jul. 13, 2022.

* cited by examiner

AMBIENT AIR DRYING OF SLUDGE

CROSS-REFERENCE TO RELATED APPLICATIONS

This application claims the benefit of, and priority to, U.S. Provisional Patent No. 63/197,853, which was filed on Jun. 7, 2021, the contents of which are incorporated by reference herein in their entirety.

BACKGROUND

The storage, handling, and effective utilization of animal waste is an ongoing challenge for animal agricultural industries, particularly in concentrated animal feeding operations (CAFOs). The swine and poultry industries, for example, produce a significant amount of animal waste that must be properly handled and utilized to ensure profitability and environmental sustainability. Such efforts are important, particularly in states where CAFOs are prevalent in large numbers, such as North Carolina and Iowa.

Legislative efforts, both federally and at the state level, set forth environmental regulations as well as incentives to develop alternative and productive uses for animal waste. Incentives are in place to effectively utilize animal waste as an energy source in North Carolina. For example, the Renewable Energy and Energy Efficiency Portfolio Standard (REPS) requires that North Carolina power companies provide approximately 30 MW of electrical capacity from swine waste by 2021. The fuel source for this power was originally foreseen to be methane from anaerobically digested pig feces. However, currently, North Carolina power producers have perpetually been unable to meet this target. Clearly the anaerobic pathway to energy production is insufficient to produce this target give current incentives.

Moreover, regulations require that nutrients within animal waste must be utilized properly to minimize potential negative environmental impacts. For example, application of animal waste to land must be carefully controlled and monitored to avoid over-application of any particular nutrient.

Thus, there remains a significant need for alternative pathways and approaches to effectively manage and utilize animal waste, including converting animal waste into usable energy. Disclosed herein are novel systems, devices and methods to address the ongoing need to effectively utilize swine waste (and other animal waste) for other purposes, thereby addressing address these long-felt needs. The disclosed systems, devices and methods overcome the crusting problem (e.g., water retention) associated with stored lagoon solids/digestate and produce a dried solid fuel/fertilizer at low expense from both digestate and lagoon solids.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

The following presents a summary to provide a basic understanding of one or more embodiments of the disclosure. This summary is not intended to identify key or critical elements, or to delineate any scope of particular embodiments or any scope of the claims. Its sole purpose is to present concepts in a simplified form as a prelude to the more detailed description that is presented later. In one or more embodiments described herein are systems, methods, and devices that describe various aspects of waste processing systems and methods for drying of a waste product to form a dried waste product.

According to an example embodiment, a system for reducing moisture content of a wet waste product is provided. In some or all embodiments of the system, the system comprises a drying surface; a dispenser configured to deposit the wet waste product onto the drying surface; an air moving device (AMD) configured to induce a flow of ambient air over the wet waste product on the drying surface to produce a dried waste product from the wet waste product; a collection area configured to transport the dried waste product away from the drying surface; and an agitator configured to move the dried waste product from the drying surface to the collection area after the dried waste product has been dried to have a predetermined moisture content.

In some or all embodiments of the system, the drying surface is substantially impermeable; and/or the drying surface is a rigid surface and/or a non-deformable surface; and/or the drying surface comprises concrete.

In some or all embodiments, the system comprises an enclosure that is arranged to cover and substantially fully enclose an area around and including the drying surface and the collection area; wherein the enclosure is configured to prevent re-wetting of the dried waste product by precipitation and to channel the flow of ambient air from the AMD over the wet waste product on the drying surface.

In some or all embodiments of the system, the AMD is one or more fans configured to draw in the flow of ambient air from outside of the enclosure to dry the wet waste product via evaporation.

In some or all embodiments, the system comprises dividers arranged within the enclosure to channel a majority of the flow of ambient air over the wet waste product on the drying surface.

In some or all embodiments of the system, the dispenser comprises an extruder configured to dispense the wet waste product onto the drying surface.

In some or all embodiments of the system, the extruder is attached to a moveable gantry configured to move the extruder over the drying surface to dispense the wet waste product over some or all of the drying surface.

In some or all embodiments of the system, the gantry is a track-mounted and/or wheeled device that comprises a first agitator and/or a second agitator.

In some or all embodiments of the system, the first agitator is movably and/or pivotably attached to the gantry, for extension of the first agitator in a direction of the drying surface; the gantry is configured to lower the first agitator to a prescribed height corresponding to a prescribed thickness of the wet waste product on the drying surface and to move along the drying surface after and/or as the wet waste product is extruded onto the drying surface to form the wet waste product on the drying surface at the prescribed thickness; the prescribed thickness is less than or equal to about 0.5 inches, such that the wet waste product dries in a convex shape with a center thereof elevated from the drying surface to allow air circulation both above and below the center of the wet waste product during drying; and after the dried waste product having the predetermined moisture content has been produced by the flow of ambient air, the gantry is configured to: lower the second agitator in contact with the drying surface and to move along the drying surface to accumulate the dried waste product; and/or lower the first agitator adjacent to the drying surface to scrape the dried waste product off of the drying surface and into the collection area.

In some or all embodiments of the system, the collection area comprises a trough at a height below the drying surface.

In some or all embodiments, the system comprises a transport in a form of a stiffened centerless auger within the trough, the transport being configured to convey the dried waste product substantially perpendicularly to a direction of travel of the gantry along the drying surface.

In some or all embodiments, the system comprises one or more sensors; and a controller configured to communicate with the one or more sensors to control a duration of drying of the wet waste product on the drying surface before being transported to the collection area.

In some or all embodiments of the system, the one or more sensors comprise a temperature sensor, which is configured to measure a temperature of the flow of ambient air at and/or through the AMD, and/or a moisture sensor, which is configured to measure a humidity or moisture content of the flow of ambient air at and/or through the AMD.

In some or all embodiments, the system comprises an enclosure that covers the drying surface and the collection area, wherein the one or more sensors comprise: an interior temperature sensor, which is configured to measure a temperature of air inside the enclosure, and an exterior temperature sensor, which is configured to measure a temperature of the ambient air outside the enclosure; and/or an interior moisture sensor, which is configured to measure a humidity or moisture content of air inside the enclosure, and an exterior moisture sensor, which is configured to measure a humidity or moisture content of the ambient air outside the enclosure; wherein the controller is configured to compare the temperature and/or humidity of the air inside the enclosure with the temperature and/or humidity of the air outside the enclosure to calculate the duration of the drying time for the wet waste product after having been dispensed on the drying surfaces.

According to another example embodiment, a method for reducing moisture content of a wet waste product is provided. In some or all embodiments of the method, the method comprises providing a drying surface; depositing, using a dispenser, the wet waste product onto the drying surface; inducing, using an air moving device (AMD), a flow of ambient air over the wet waste product on the drying surface to produce a dried waste product having a predetermined moisture content from the wet waste product; moving, using an agitator, the dried waste product from the drying surface to a collection area after the dried waste product has been determined to have the predetermined moisture content; and transporting the waste product out of the collection area.

In some or all embodiments of the method, the drying surface is substantially impermeable; and/or the drying surface is a rigid surface and/or a non-deformable surface; and/or the drying surface comprises concrete.

In some or all embodiments, the method comprises arranging an enclosure to cover and substantially fully enclose an area around and including the drying surface and the collection area; wherein the enclosure prevents re-wetting of the dried waste product by precipitation and channels the flow of ambient air from the AMD over the dried waste product on the drying surface.

In some or all embodiments of the method, the AMD is one or more fans that draw in the flow of ambient air from outside of the enclosure to dry the wet waste product via evaporation.

In some or all embodiments, the method comprises arranging dividers within the enclosure to channel a majority of the flow of ambient air over the wet waste product on the drying surface.

In some or all embodiments of the method, the dispenser comprises an extruder, the method comprising dispensing, using the extruder, the wet waste product onto the drying surface.

In some or all embodiments of the method, the extruder is attached to a moveable gantry, the method comprising moving, using the gantry, the extruder over the drying surface to dispense the wet waste product over some or all of the drying surface.

In some or all embodiments of the method, the gantry is a track-mounted and/or wheeled device that comprises a first agitator and/or a second agitator.

In some or all embodiments, the method comprises movably and/or pivotably attaching the first agitator to the gantry for extension of the first agitator in a direction of the drying surface; lowering the first agitator to a prescribed height corresponding to a prescribed thickness of the wet waste product on the drying surface; moving the gantry along the drying surface after and/or as the wet waste product is extruded onto the drying surface to form the wet waste product on the drying surface at the prescribed thickness, wherein the prescribed thickness is less than or equal to about 0.5 inches, such that the wet waste product dries in a convex shape with a center thereof elevated from the drying surface to allow air circulation both above and below the center of the wet waste product during drying; and after the dried waste product having the predetermined moisture content has been produced by the flow of ambient air, using the gantry to: lower the second agitator in contact with the drying surface and to move along the drying surface to accumulate the dried waste product; and/or lower the first agitator adjacent to the drying surface to scrape the dried waste product off of the drying surface and into the collection area.

In some or all embodiments of the method, the collection area comprises a trough at a height below the drying surface.

In some or all embodiments, the method comprises transporting, using a transport in a form of a stiffened centerless auger within the trough, the dried waste product substantially perpendicularly to a direction of travel of the gantry along the drying surface.

In some or all embodiments, the method comprises providing one or more sensors; providing a controller in communication with the one or more sensors; and controlling, using the controller, a duration of drying of the wet waste product on the drying surface before being transported to the collection area.

In some or all embodiments of the method, the one or more sensors comprise a temperature sensor, which is used to measure a temperature of the flow of ambient air at and/or through the AMD, and/or a moisture sensor, which is used to measure a humidity or moisture content of the flow of ambient air at and/or through the AMD.

In some or all embodiments of the method, the one or more sensors comprise an interior temperature sensor and an exterior temperature sensor and/or an interior moisture sensor and an exterior moisture sensor, the method comprising:

arranging an enclosure to cover and substantially fully enclose an area around and including the drying surface and the collection area; measuring, using the interior temperature sensor, a temperature of air inside the enclosure and, using the exterior temperature sensor, a temperature of air outside the enclosure; and/or measuring, using the interior moisture sensor, a humidity, or moisture content, of air inside the enclosure and, using the exterior moisture sensor, a humidity, or moisture content, of air outside the enclosure; and comparing, using the controller, the temperature and/or humidity of the air inside the enclosure with the temperature and/or humidity of the ambient air outside the enclosure to calculate the duration of the drying time for the wet waste product after having been dispensed on the drying surfaces.

These and other objects are achieved in whole or in part by the presently disclosed subject matter. Further, objects of the presently disclosed subject matter having been stated above, other objects and advantages of the presently disclosed subject matter will become apparent to those skilled in the art after a study of the following description, Drawings and Examples.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

DETAILED DESCRIPTION

Figure 1:
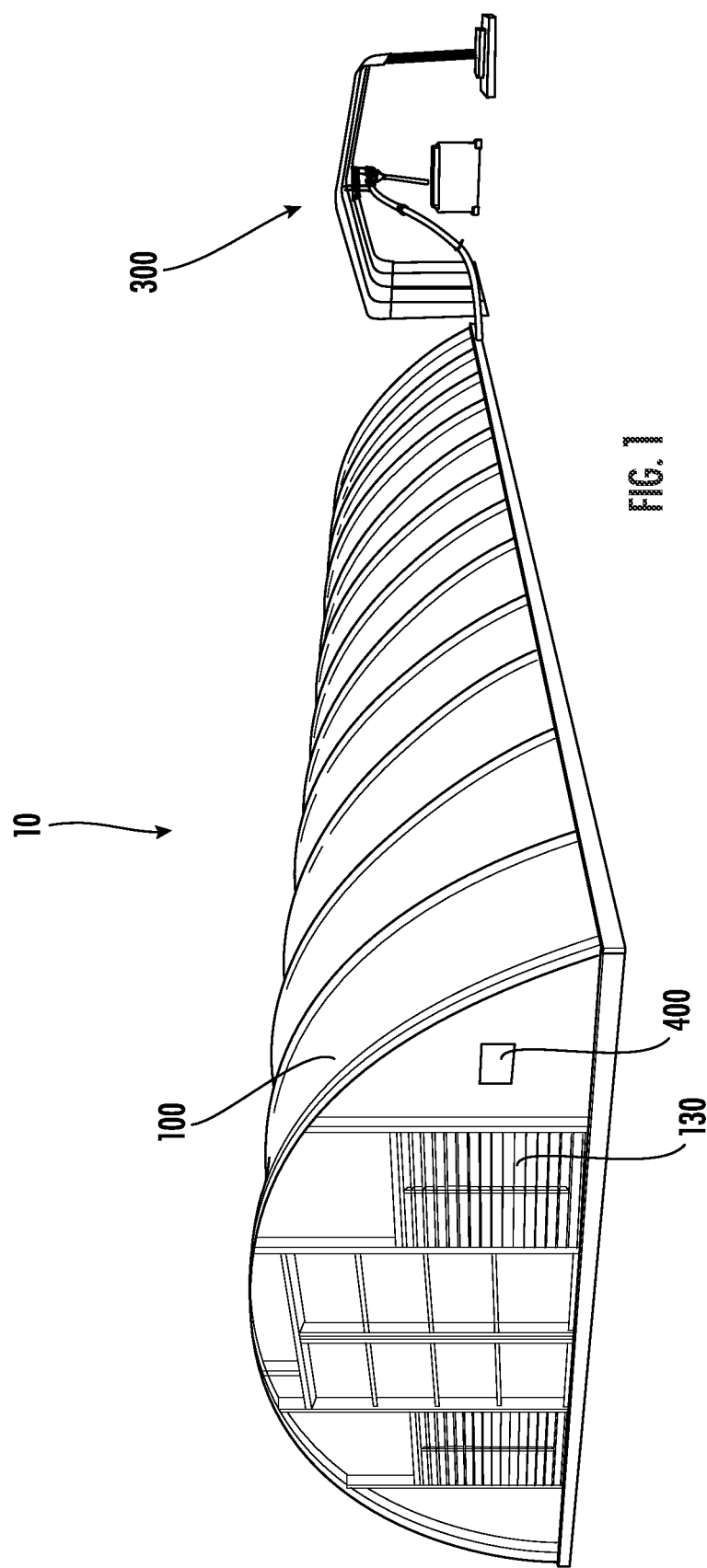
FIG. 1 is a perspective external view of an example embodiment of a waste processing system, in which wet waste product is dried to produce dried waste product.
Figure 2:
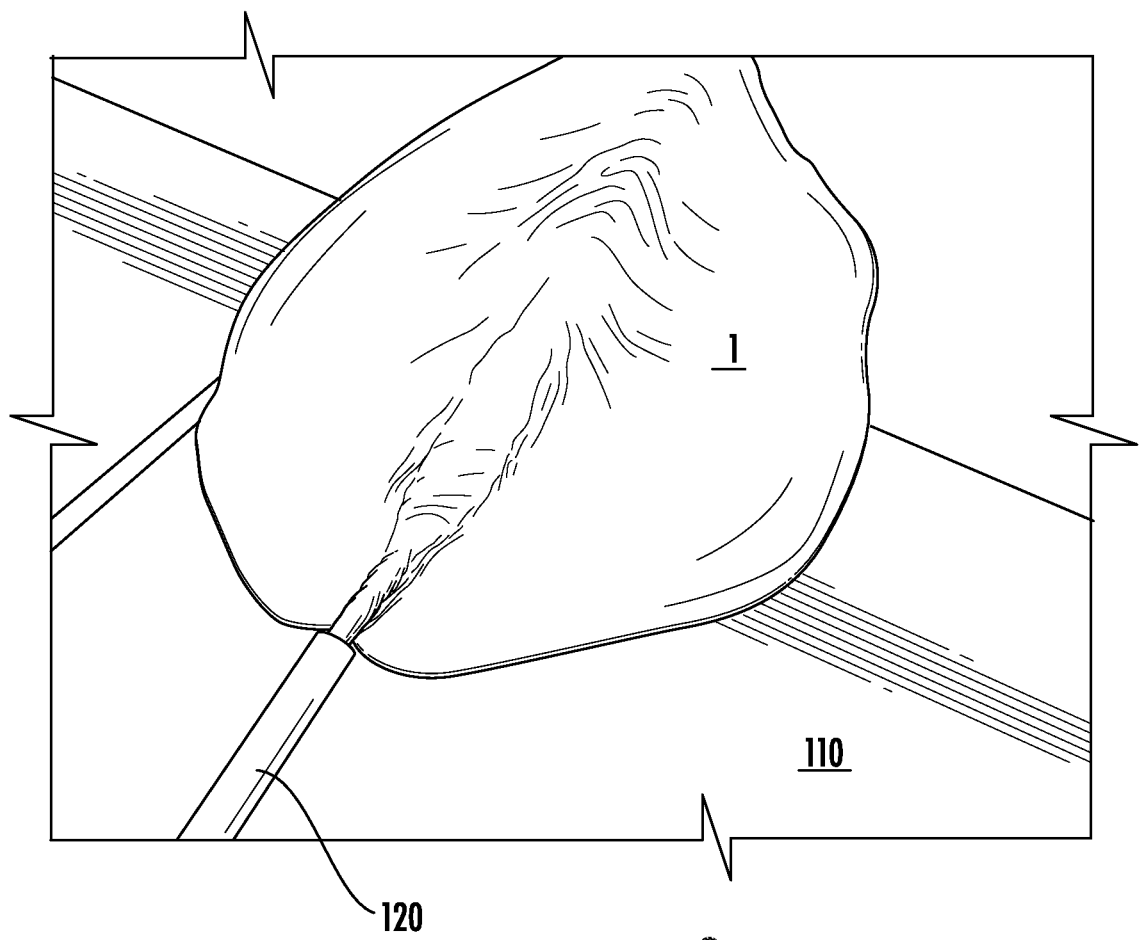
FIG. 2 is a perspective view of a wet waste product for drying in the example embodiments of the waste processing systems disclosed herein.

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a component" includes a plurality of such components, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C and D.

Referring now to the figures, wherein like reference numerals refer to like parts throughout, FIGS. 1-13 show various aspects of an example embodiment of a waste processing system 10 for processing (e.g., drying) lagoon waste (e.g., from a swine lagoon). In the example embodiment disclosed herein, the waste processing system 10 comprises one or more enclosures 100, one or more (e.g., a series of) drying surfaces 110, waste extruders 120, air moving devices (AMDs) 130, collection trough 310, and gantry 200, which, together, are used to convert a wet waste product 1 (e.g., lagoon sludge or other suitable waste material, such as animal waste) into a dried waste product 2, which can be, in some embodiments, a flake, powder, and/or extruded and dried waste product. In some embodiments, the waste processing system 10 disclosed herein can be referred to as a system to dry lagoon waste, a swine waste system, a drying system, an extrusion and drying system, etc. The gantry 200 comprises agitators (see, e.g., first and second agitators 210, 220) (e.g., scrapers, brushes, and the like) used for spreading and/or agitating the wet waste product 1 and/or for agitating (e.g., scraping, brushing, etc.) the dried waste product 2 produced by the waste processing system 10. Such waste processing systems 10 can, in some embodiments, comprise one or more dispensers 120 (e.g., in the form of one or more waste extruders), one or more drying surfaces 110, and one or more air moving devices 130 (e.g., forced air components, such as a fan, blower, etc.), which, together, provide a mechanism for reducing the moisture content of a wet waste product 1 to produce a substantially dried waste product 2, which can be in any suitable form, including flakes, powder, chips, clumps etc. By efficiently drying and forming the dried waste product 2 into a desired form-factor, the dried waste product 2 is more readily transportable, storable, and usable for value-added applications.

By way of example, lagoon sludge, sludge waste, lagoon waste, animal waste, etc., also collectively referred to as the wet waste product 1, and, particularly, the wet waste product 1 suitable for use and/or processing in the example embodiment of the waste product system 10, can have, in an unprocessed state, a moisture content of about 50% to about 98%, inclusive, about 60% to about 90%, inclusive, or about 70% to about 85%, inclusive. Thus, the wet waste product 1 can have a moisture content of about 50% to about 98%, inclusive, about 60% to about 90%, inclusive, or about 70% to about 85%, inclusive. In contrast, the dried waste product 2 produced by the example embodiment of the waste processing system 10 can have a moisture content of about 1% to about 30%, inclusive, or about 5% to about 15%, inclusive. In some embodiments, such as where the wet waste product 1 comprises solids dredged from an animal waste lagoon (e.g., swine lagoon), such lagoon sludge solids can be about 2.5-25% solids as dredged, with the remainder being aqueous material. In some embodiments, the wet waste product 1 has a solids content of between about 4% and about 25% upon initial isolation (e.g., upon introduction onto the drying surface 110), including 4, 5, 6, 7, 8, 9, 10, 11, 12, 13, 14, 15, 16, 17, 18, 19, 20, 21, 22, 23, 24, or 25%. In some embodiments, the wet waste product 1 can have a low solid content, in which case it can be bulked up and/or dewatered before drying, or extrusion and drying, using the example embodiment of the waste processing system 10 disclosed herein. In some aspects, agricultural or other organic waste can be used for bulking of the wet waste product 1, including, for example, tobacco processing waste, wood manufacturing residue waste, poultry/broiler litter, etc. Any combination of the bulking agents described hereinabove, including the use of previously produced dried waste product 2, may be used for bulking the wet waste product 1 without deviating from the scope of the disclosure herein. In some aspects, the wet waste product 1 may be decanted to settle the solids contained therein from the lower solids top water. It has been determined that a period of decanting of between 1-3 weeks is typically capable of concentrating the wet waste product 1 to have solids of about 8%.

The example embodiment of the waste processing system 10 disclosed herein solve the acute problem of lagoon solids disposal by turning a waste product into a commercially valuable product. In some embodiments, the example embodiment of the waste processing system 10 disclosed herein achieves these results in a way that uses low energy input, so it does not require a supplemental heat source (e.g., is formed without using any external heat source other than ambient air temperature). One additional advantage to the waste processing systems 10 disclosed herein is that they can be configured to utilize anaerobic digestate.

Figure 12:
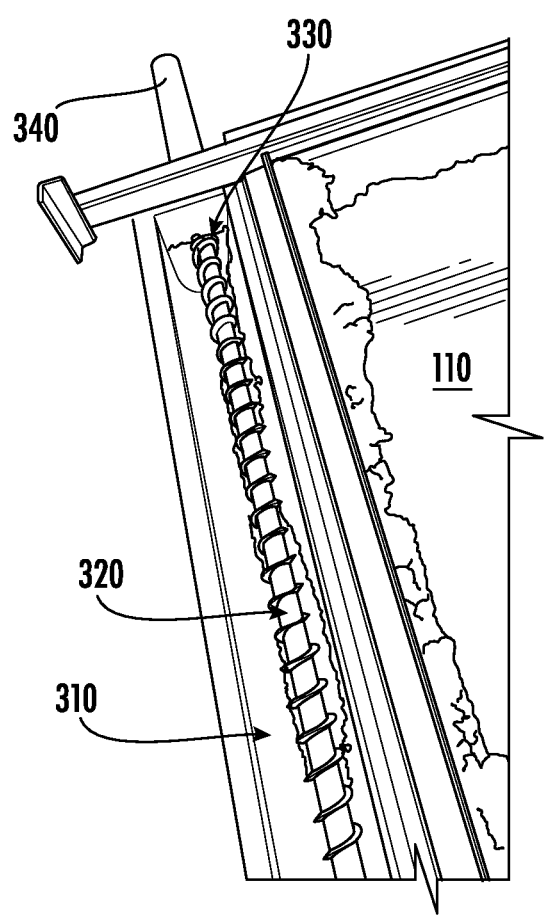
FIG. 12 is a perspective view in which example aspects of a waste product transport system are shown for transporting the dried waste product within the example embodiment of the waste processing system disclosed herein.

According to this example embodiment, the waste processing system 10 includes a drying surface 110; a dispenser 120 for depositing the wet waste product 1 onto the drying surface 110; a collection area (e.g., trough 310, as shown in FIG. 12) in which the dried waste product 2 is collected from the drying surface 110 and, optionally, transported by the waste processing system 10 to a receptacle 370 (see FIG. 13); an enclosure 100 that covers (e.g., substantially encloses, partially and/or entirely) the drying surface 110 and the trough 310 and is configured to prevent re-wetting by precipitation (e.g., rainfall, snow, etc.) of the dried waste product 2 during or after drying; an air moving device 130 (AMD) that draws in ambient air from outside the enclosure 100 to produce a flow of ambient air (e.g., unheated ambient, or environmental, air) over the wet waste product 1 dispensed over the surface of the drying surface 110; and a gantry, generally designated 200, that moves the wet waste product 1 over the drying surface 110; optionally, dispenses the wet waste product 1 over the drying surface 110 to form a layer of the wet waste product 1 with a substantially constant thickness; agitates the wet waste product 1 on the drying surface 110, whether before and/or after the drying process has been initiated; and moves, after the wet waste product 1 has been dried sufficiently to form the dried waste product 2, the dried waste product 2 from the drying surface 110 to the trough 310 after the dried waste product 2 has been dried to a predetermined moisture content.

While the drying surface 110 can comprise or consist of any suitable material, including a flexible material (e.g., as in a conveyor belt, suspended surface, and the like), in the example embodiment disclosed herein, the drying surface 110 is made of a substantially impermeable and substantially rigid (e.g., non-deformable) material, for example, concrete. The drying surface 110 can have any suitable shape, but is shown in the example embodiment as being generally planar (e.g., flat) and having walls arranged around a perimeter thereof to maintain a thickness of the wet waste product 1 on the drying surface 110 to prevent runoff of the wet waste product 1 from the drying surface 110. The waste processing system 10 can include any quantity of drying surfaces 110, including a plurality of drying surfaces 110, which can be arranged in parallel, series, or an array with respect to the flow of the ambient air through the enclosure 100. In some embodiments, the drying surfaces 110 are mobile drying surfaces capable of being readily transported between locations where the wet waste product 1 is located (e.g., adjacent to a swine lagoon). In some embodiments, such as those shown and described in the example embodiment, the drying surfaces 110 are fixedly installed and are substantially immovable, in which case the drying surfaces 110 can be abandoned once all locally available waste product has been dried, retained for continued use as further wet waste product 1 is produced, and/or used continuously with wet waste product 1 being transported to the waste processing system 10 for drying on such drying surfaces 110.

Figure 9:
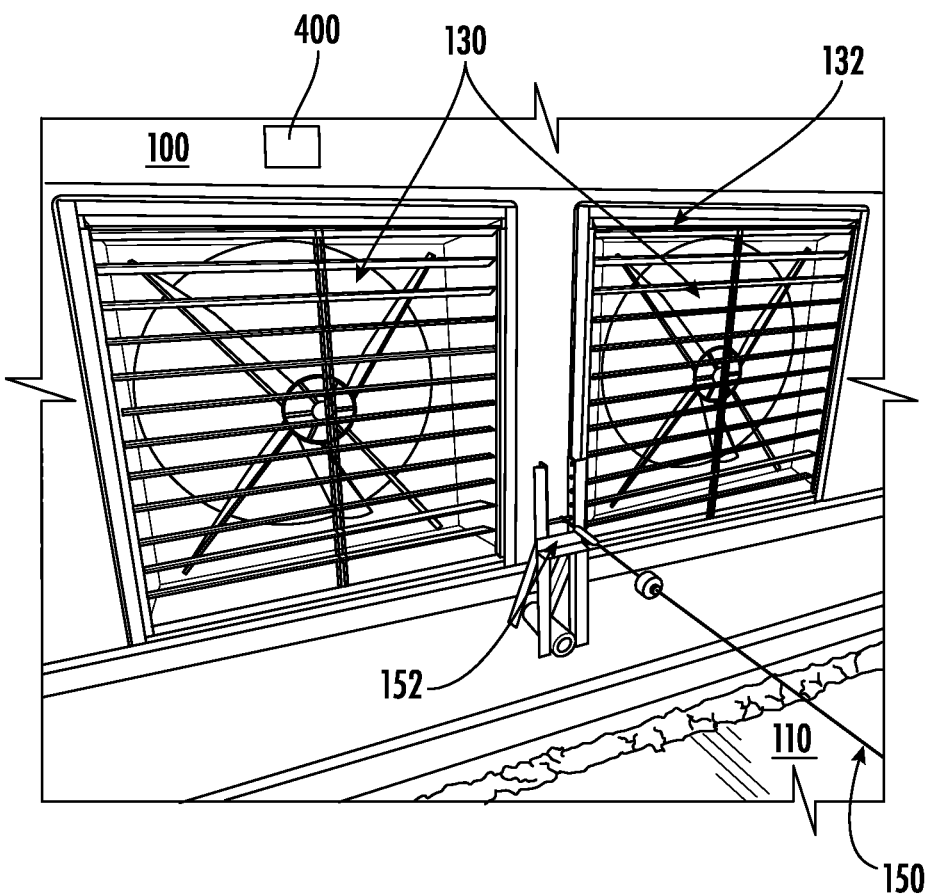
FIG. 9 is a perspective view of an example embodiment of air moving devices suitable for use in moving air through the enclosure of the example embodiment of the waste processing system disclosed herein.

As shown in FIG. 9, the waste processing system 10 comprises a plurality of AMDs 130, but is not limited thereto and can have any quantity of AMDs 130 suitable for a particular drying environment and/or application. Examples of suitable AMDs 130 include, without limitation, fans, blowers, and the like. Essentially, any device that is capable of generating a suitable volume and velocity of ambient air flowing through the interior of the enclosure 100 can be used in conjunction with the waste processing systems 10 and methods disclosed herein. The AMDs 130 can be provided internal to, or external from, the enclosure 100 and are configured to draw warm (e.g., environmental, unheated), dry (e.g., having a humidity or moisture content prevailing at the location of the waste processing system 10 while drying the wet waste product 1) ambient air from outside of the enclosure 100 into the enclosure 100. Thus, the energy contained within the warm, dry ambient air is used to evaporatively dry, due to turbulence of the ambient air flowing through the enclosure 100, the wet waste product 1 without the use of a heat source to apply any heat to the wet waste product 1 during the drying process at any point until the dried waste product 2 is removed from the drying surface 110 and transferred into the trough 310. As a result of evaporative drying of the wet waste product 1, the flow of air exiting the enclosure is comparatively cooler and has a higher moisture content than the ambient air external to the enclosure 100 that was drawn in by the AMDs 130. The waste processing system 10 also comprises louvers, generally designated 132, which are provided adjacent to (e.g., upstream and/or downstream from) the AMDs 130. The louvers 132 can be used to control a volumetric flow rate of the flow of ambient air through the AMD 130 with which such louvers 132 are associated, as well as to be closed upon the occurrence of precipitation outside of the enclosure 100, in which case the AMDs 130 would also be turned off so as to not blow water over the wet waste product 1 being dried and/or onto the dried waste product 2, in which case the introduction of such moisture from precipitation may cause rewetting of the dried waste product 2. Additionally, closing of the louvers 132 can prevent wind-driven precipitation from being blown onto the drying surface 110, which is undesirable regardless of whether there is the wet waste product 1 of the dried waste product 2 thereon, or at a partially dried state of the waste product. In some embodiments, it may be advantageous for the louvers 132 to be oriented to direct the flow of ambient air in a vertically downwardly inclined direction, so that the flow of ambient air is impinged against the surface of the wet waste product 1 or the dried waste product 2, as the case may be, to provide a higher velocity of the flow of ambient air immediately adjacent to, or against, the upper surface of the wet waste product 1 or of the dried waste product 2.

In addition to preventing the dried waste product 2 (or partially dried waste product) from being re-wetted during or after the drying process, the enclosure 100 is further provided to advantageously channel the flow of ambient air from the AMDs 130 over the wet waste product 1 on the drying surface 110. In the example embodiment, the enclosure 110 is a greenhouse, but can be any suitable structure, including a rigid enclosure, which can be lightweight in some instances.

Figure 3:
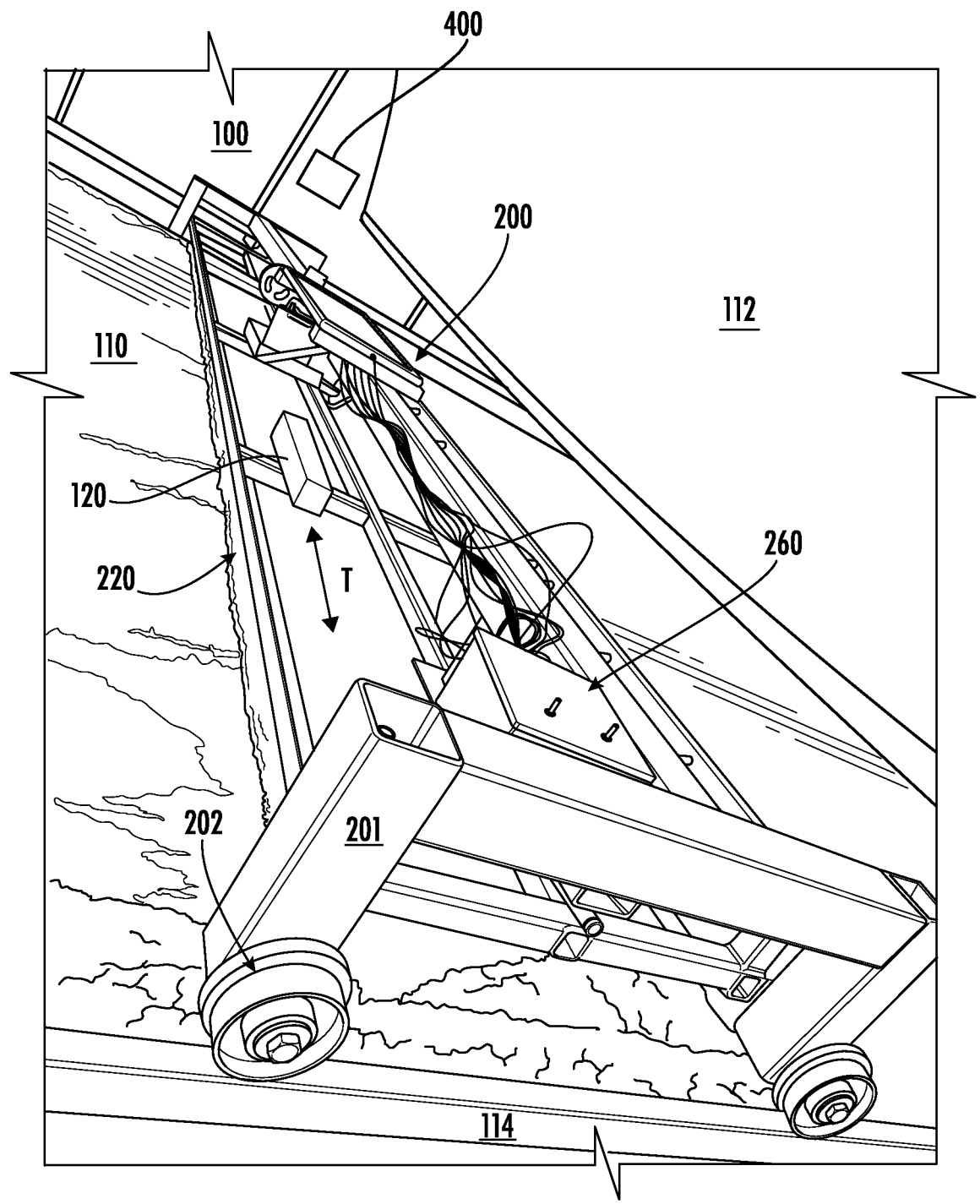
FIGS. 3-8 are respective perspective views of various aspects and/or features of an example embodiment of a waste processing system, including an example embodiment of a gantry of the waste processing system.
Figure 4:
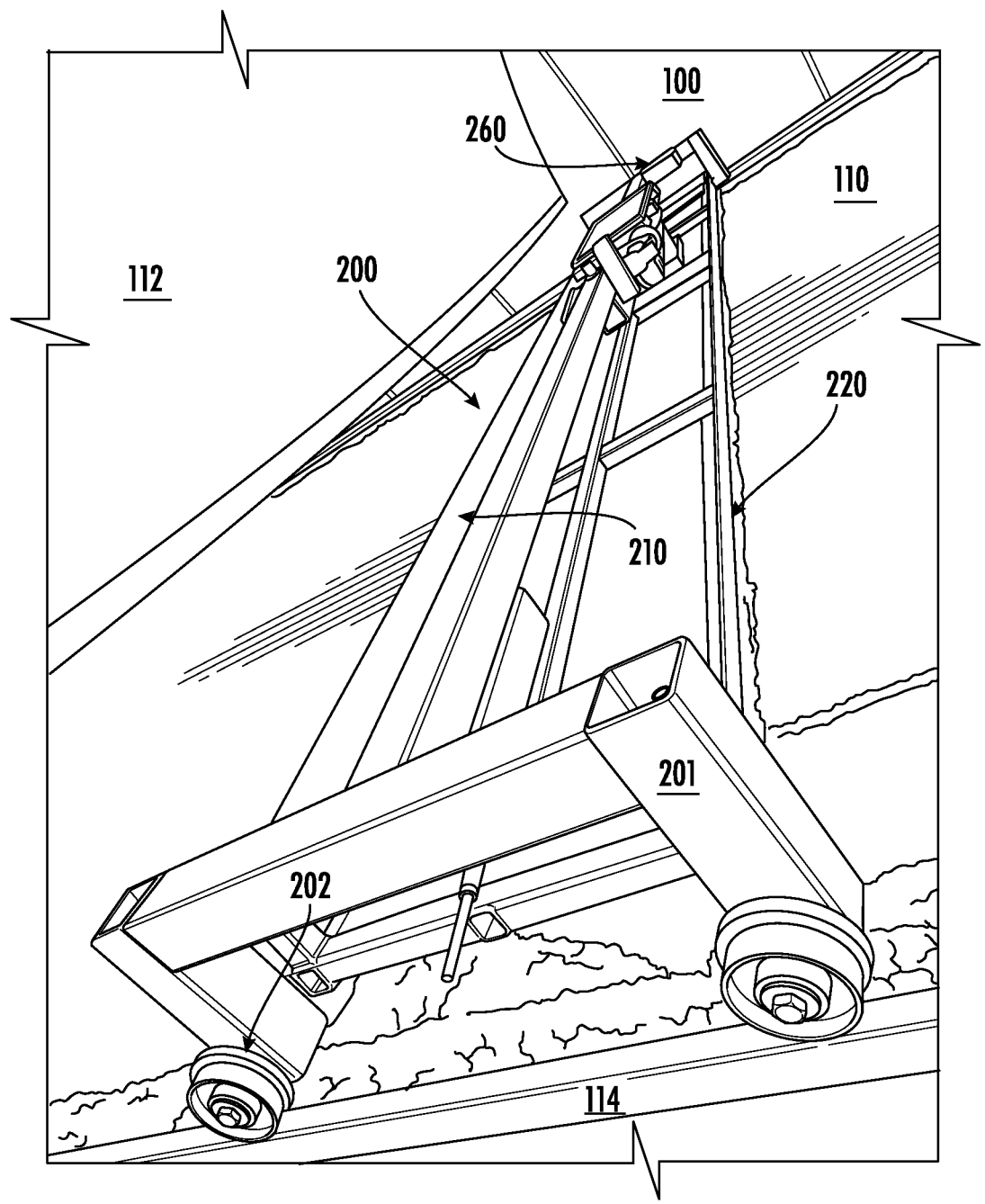
Figure 5:
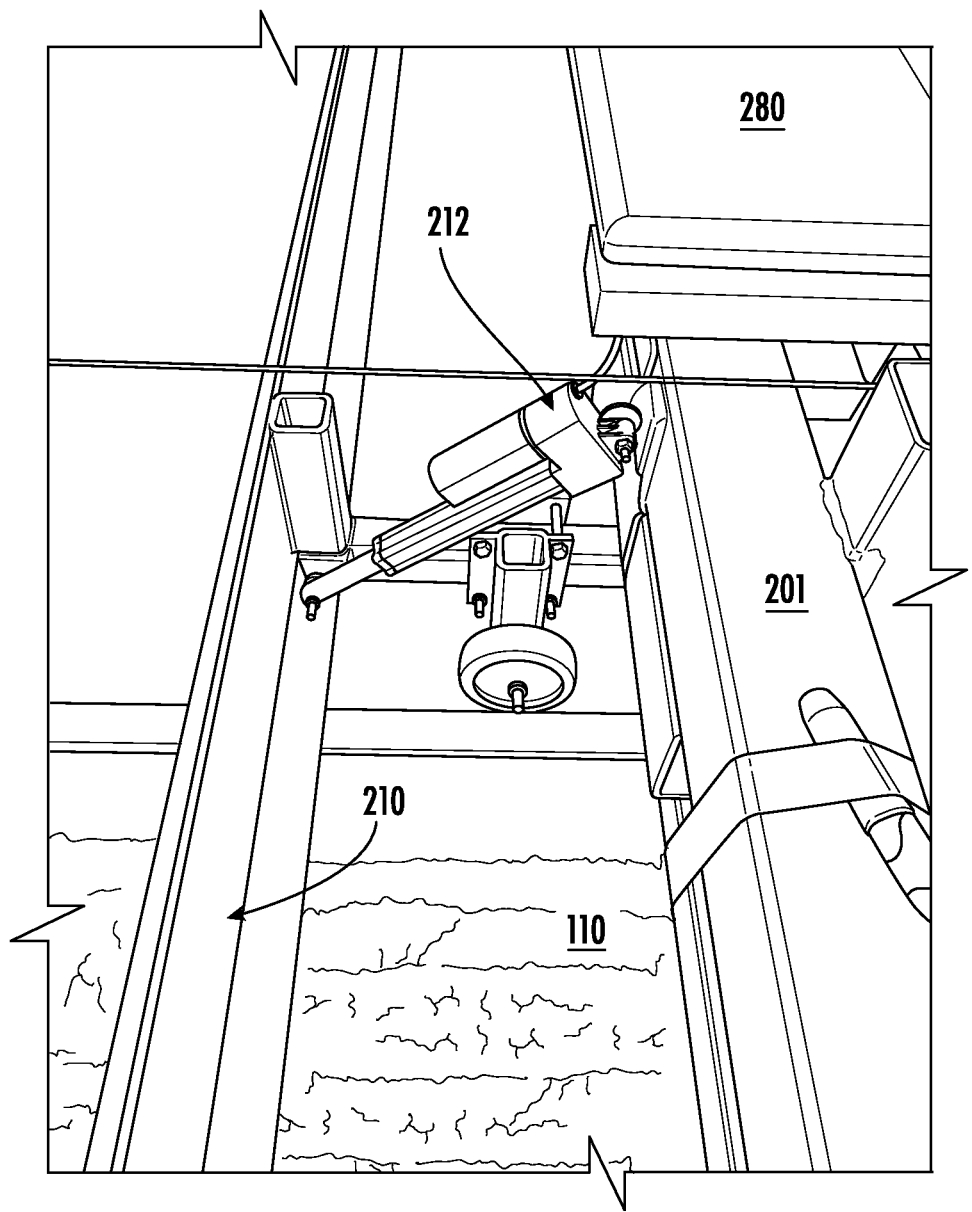
Figure 6:
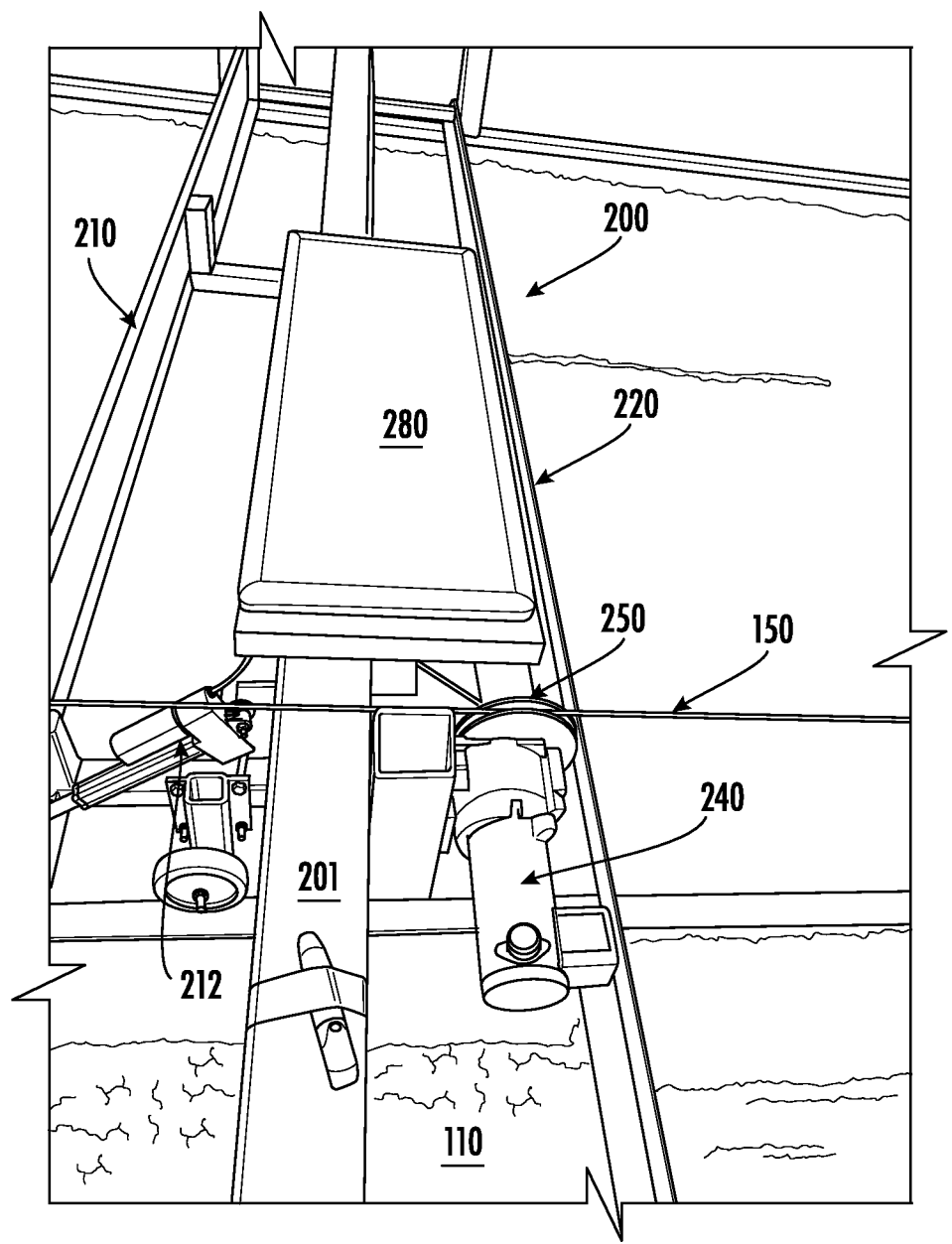
Figure 7:
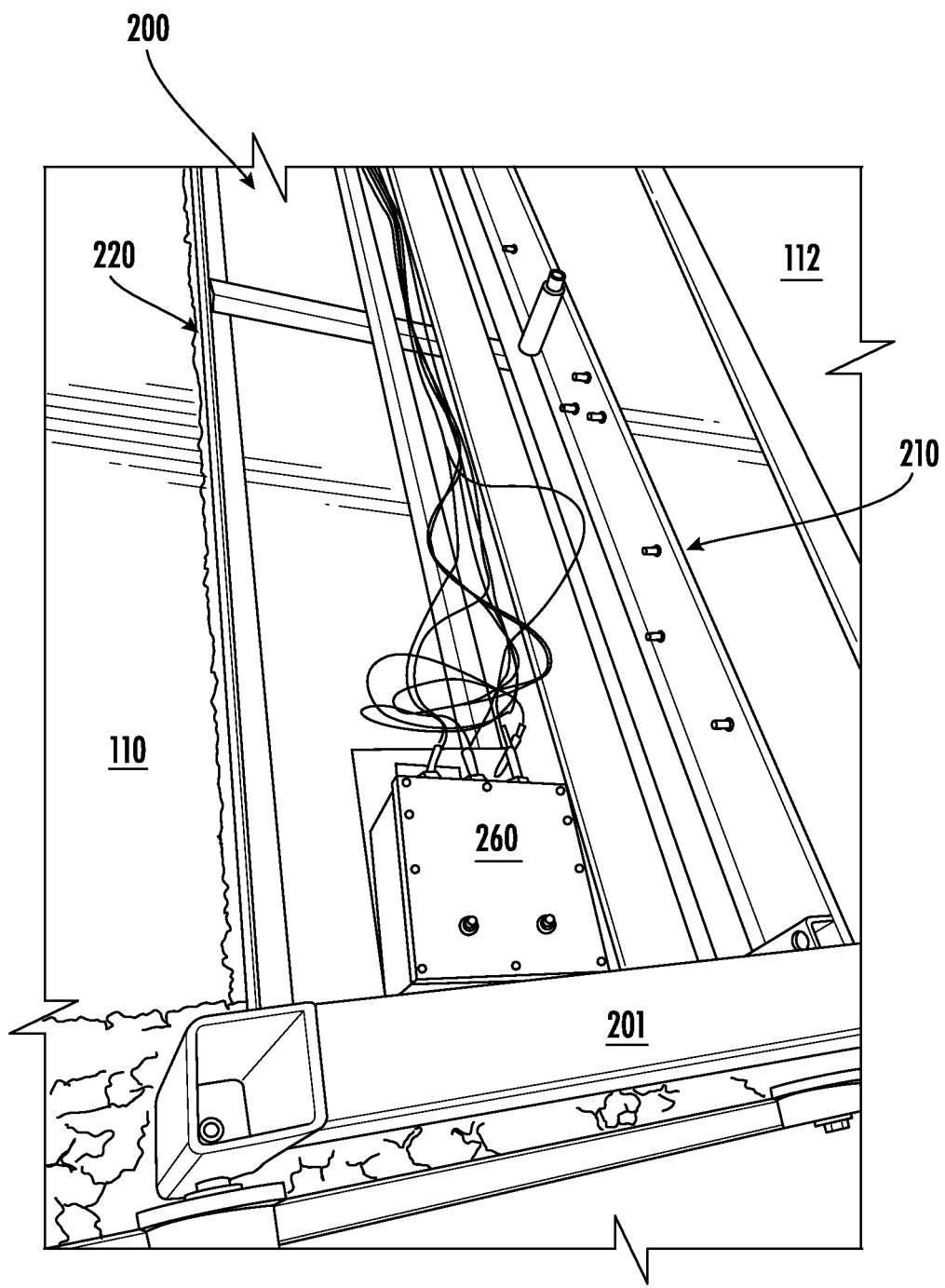
Figure 8:
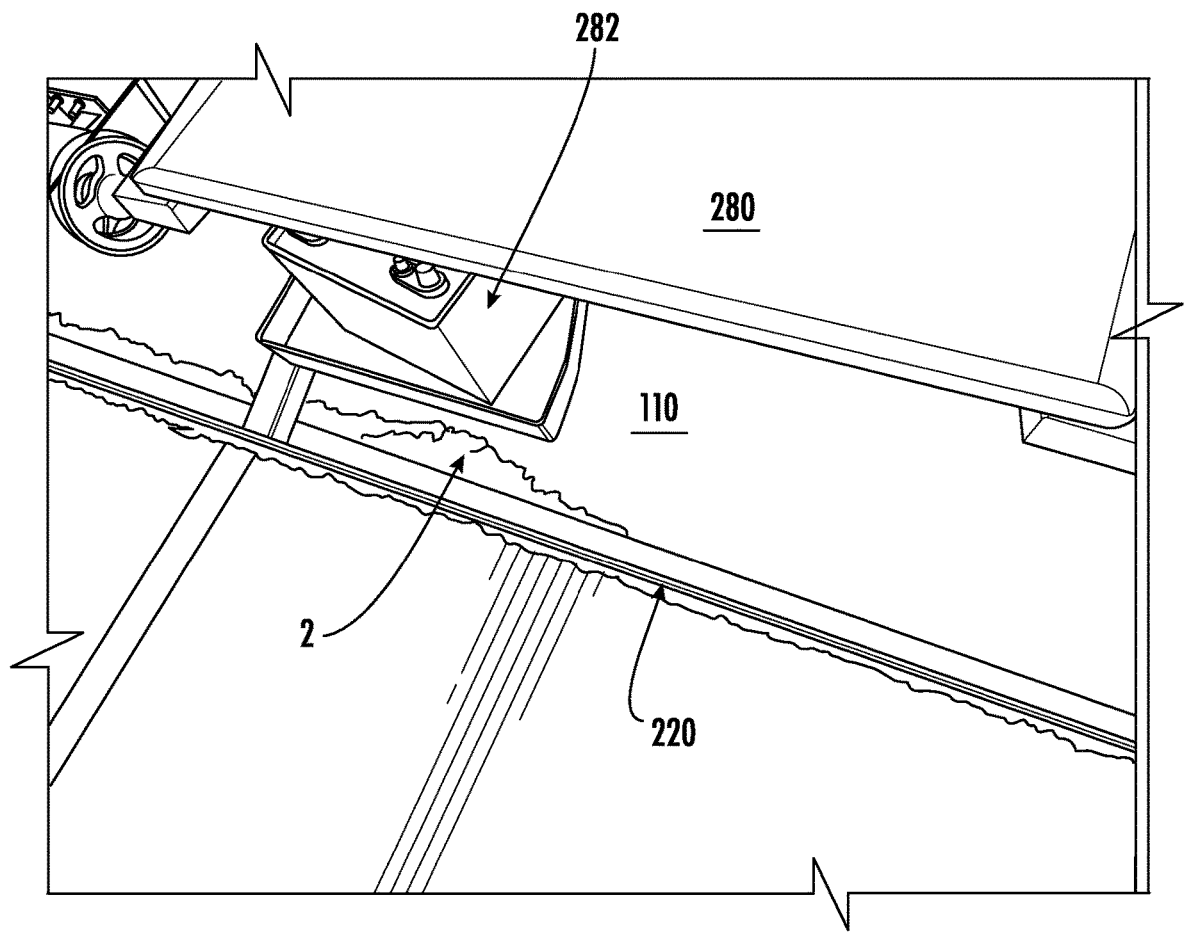
Figure 10:
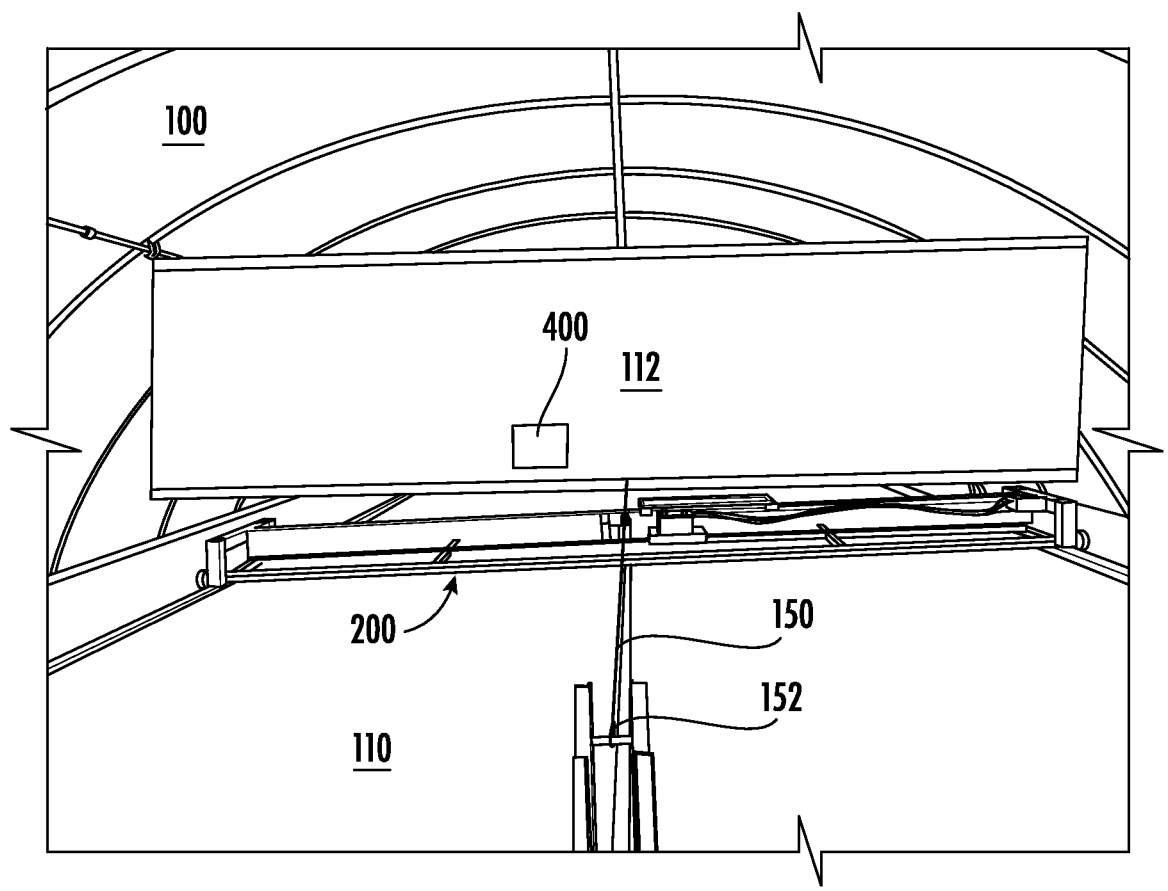
FIG. 10 is a perspective view of a portion of an interior of the enclosure of the example embodiment of the waste processing system.
Figure 11:
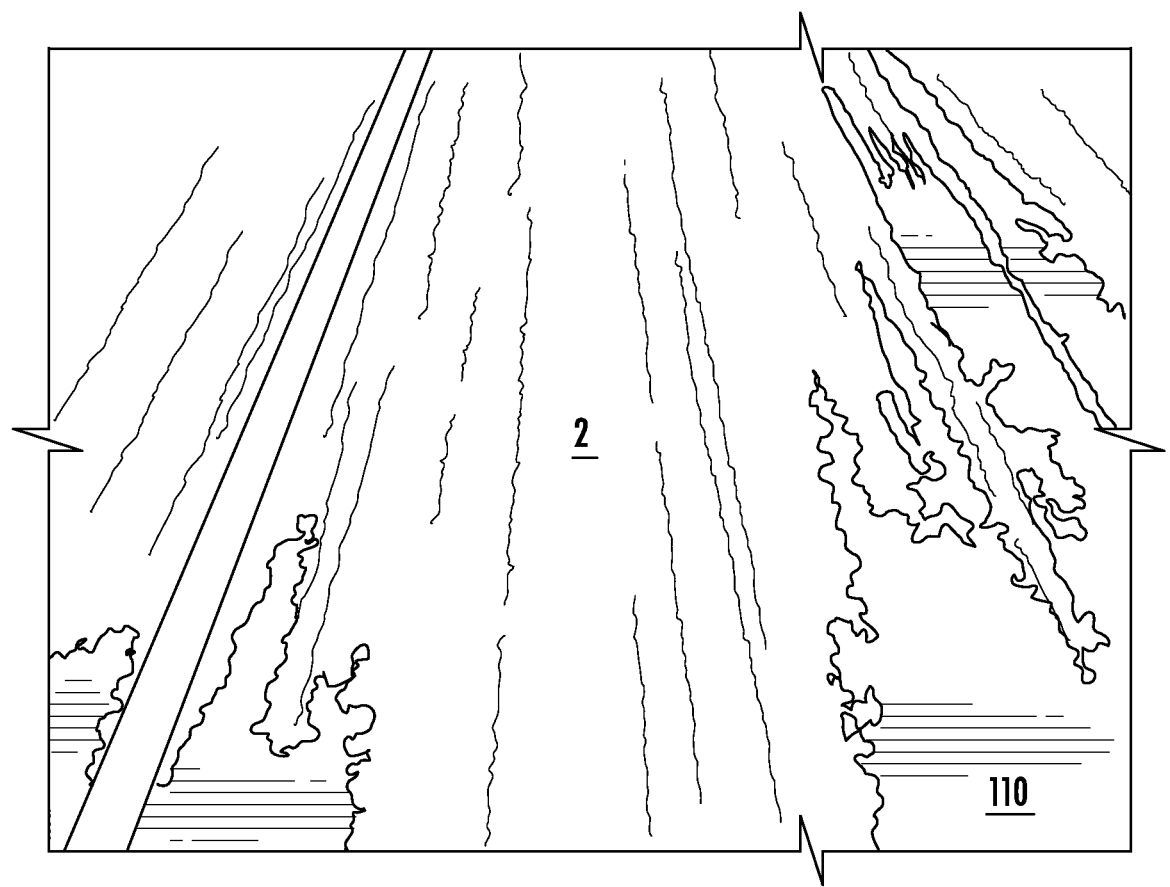
FIG. 11 is a perspective view in which aspects of an example dried waste product produced by the example embodiment of the waste processing system disclosed herein is shown on the drying surface thereof.

As best seen in FIGS. 3, 4, and 10, one or more dividers 112 (e.g., baffles) are provided within the enclosure 100 above the drying surface 110 to prevent the flow of ambient air from bypassing the surface of the wet waste product 1 and instead forcing the flow of ambient air to pass between the bottom edge of the divider 112 and the top surface of the wet waste material 1, such that the localized flow velocity adjacent to the top surface of the wet waste material 1 is increased (e.g., as compared to an enclosure 100 without such dividers 112). Thus, the dividers 112 act to channel the flow of ambient air to be primarily over the wet waste product 1 on the drying surface 110. The dividers 112 can be positioned to block, in a cross-sectional view along the direction of the flow of ambient air, substantially all of the internal cross-sectional area of the enclosure 100 other than over (e.g., directly over) the drying surface 110. Thus, the dividers 112 can be arranged within the enclosure 100 so that the flow of ambient air can only pass under each of the dividers 112, in a space directly between the bottom of the divider 112 and the top surface of the wet waste product 1. This space for the flow of the ambient air is advantageously substantially similar to the height of the gantry 200 over the drying surface 110, so that the gantry 200 can move under the dividers 112 along the length of the drying surface 110 with the dividers 112 remaining in position (e.g., requiring no movement of, or reconfiguration of, the dividers 112 relative to the enclosure 100).

The air speed in the immediate vicinity of the upper, or exposed, surface of the wet waste product 1 during the drying process is an important factor in the amount of time needed to sufficiently dry the wet waste product 1 to produce the dried waste product 2. As such, the dividers 112 are advantageously configured to maximize the velocity and/or speed of the flow of ambient air over the wet waste product 1. Increasing the velocity and/or speed of the flow of ambient air directly adjacent to the upper surface of the wet waste product 1 will increase the turbulence of the flow of ambient air and, accordingly, will provide enhanced mixing within the flow of ambient air and also impingement and/or contact between the air molecules contained within the flow of ambient air and the surface(s) of the wet waste product 1 on the drying surface 110 that are exposed to the flow of ambient air, such that moisture (e.g., water) is evaporatively drawn out of the wet waste product 1 by contact of the air particles of the flow of ambient air with the upper surface of the wet waste product 1.

In some embodiments, the AMDs 130 can be provided at an inlet of an airflow channel defined by the enclosure 100 and the dividers 112 provided therein, such that the AMDs 130 are positioned to "push" the flow of ambient air through the enclosure 100. In some embodiments, the AMDs 130 can be provided at an outlet of the airflow channel defined by the enclosure 100 and the dividers 112 provided therein, such that the AMDs 130 are positioned to "pull" the flow of ambient air through the enclosure 100. In some embodiments, AMDs 130 can be provided at both the inlet and the outlet of the airflow channel defined by the enclosure 100 and the dividers 112 provided therein, such that the AMDs 130 are positioned to operate in a "push-pull" configuration to move the flow of ambient air through the enclosure 100. In some embodiments, one or more (e.g., a plurality of) AMDs 130 are provided within the enclosure 100 (e.g., inclined with respect to the length of the enclosure 100, including AMDs 130 oriented to produce an airflow that impinges on the upper surface of the wet waste product 1) to generate additional turbulence by stirring the air within the enclosure 100, in addition to moving the air through the enclosure 100.

As used herein, the term "dispenser" can include any device capable of providing the wet waste product 1 onto and/or over the drying surface 110. In the example embodiment disclosed herein, the dispenser 120 comprises one or more (e.g., a plurality of parallel arranged) extruders (e.g., orifices, ducts, pipes, and the like) that are operable to dispense the wet waste product 1 onto the drying surface 110. The wet waste product 1 supplied to the extruder of the dispenser 120 advantageously has a solids content of between about 6% and about 25%, inclusive. However, wet waste product 1 having a solids content less than or greater than this range can also be utilized in the waste processing systems 10 disclosed herein. However, the range of 6-15% solids content for the wet waste product 1 is advantageous in that, as the wet waste product 1 dries via evaporation, the wet waste product 1 curls, when in the form of a partially dried waste product, in a convex manner to form a "flake" with a center that becomes elevated (e.g., spaced apart from, and not in direct contact with) the drying surface 110, thereby allowing for the flow of ambient air to pass both on top of and at least partially under the "flake" during the drying process. This increased surface area of the partially dried waste product (e.g., as the moisture content decreases during the drying process) that is exposed to the flow of ambient air from the AMDs 130 increases the efficacy, speed, and efficiency of moisture removal from the wet waste product 1 and decreases the amount of time necessary to achieve a specified moisture content for the dried waste product 2. By virtue of this convex drying behavior, drying rates can be achieved using the disclosed waste processing systems 10 and methods that are faster than that of open water.

It has further been found that increasing the solids content of the wet waste product 1 prior to it being dispensed over the drying surface 110 increases the productivity of the waste processing systems 10 and methods disclosed herein, as measured by the amount of dried waste product 2 that can be produced per unit of time. This is because the higher solids concentration of the wet waste product 1 means that there is necessarily a corresponding decrease in moisture content in the wet waste product 1 and, as such, less moisture has to be evaporatively removed from the wet waste product 1 to produce a dried waste product 2 of any prescribed moisture content therefrom. In order to increase the rate of production of dried waste product 2, in some embodiments the portion of the wet waste product 1 having a higher liquid content and a lower solids content may be decanted to concentrate (e.g., by gravity-assisted settling) the solids portion of the wet waste product 1 from the liquid portion thereof. It has been found that periods of settling of between 1-3 weeks, inclusive, are typically sufficient to achieve a solids concentration of about 6-20% for the wet waste product 1.

While any device may be used that will allow for relative movement between the dispenser 120 and the drying surfaces 110 to allow for wet waste product 1 to be dispensed over substantially every portion (e.g., an entirety) of the drying surface 110 by the dispenser 120, in the example embodiment disclosed herein, the wet waste product 1 is dispensed over the drying surface 110 from the dispenser in the form of a pipe, tube, hose, etc. that has an open end positioned within and/or vertically over the drying surface 110 to allow a flow of the wet waste product 1 onto and/or over the drying surface 110; the wet waste product 1 is supplied to the pipe, tube, or hose from a pump, reservoir, or any suitable waste product supply source. In some embodiments, the dispenser 120 (e.g., an extruder, or extruders) is attached to a moveable gantry 200 that moves in the direction T (see FIG. 3) the dispenser 120 over the drying surface 110 to dispense the wet waste product 1 over the drying surface 110. In some embodiments, the dispenser 120 is capable of movement relative to the gantry 200, for example, in a direction substantially perpendicular to the direction of travel of the gantry 200 relative to the drying surface 110.

Continuing with particular reference to FIGS. 3-10, in the example embodiment shown, the wet waste product 1 is deposited onto the drying surface 110 at the inlet of the enclosure 100 (e.g., adjacent to the AMDs 130) and is then moved (e.g., by spreading, using the gantry 200) over the drying surface 100 using the leveling arm of the gantry. Such a gantry 200 can be, for example and without limitation, a track-mounted and/or a wheeled device, in which wheels 202 are attached to the frame 201 of the gantry 200. The wheels 202 are in rolling contact with rails 114 that are arranged around the perimeter (e.g., on lateral edges of, with respect to the travel direction of the gantry 200) of the drying surface 110. As shown in at least FIG. 6, movement of the gantry along the rails 114 is controlled by actuation of a transit motor, generally designated 240, which is rigidly attached to the frame 201 of the gantry 200. At the driven end of the transit motor 240, a guide wheel 250 is rotatably attached thereto. The guide wheel 250 is attached to the transit motor 240 for the transit motor 240 to transmit (e.g., directly) a rotary force to the guide wheel 250 to cause a rotary movement of the guide wheel 250 about an axis of rotation. The guide wheel 250 is attached to a guide wire, generally designated 150 by the guide wire 150 being wrapped one or more times around the circumference of the guide wheel 250, such that a rotation of the guide wheel 250 will cause, at a first side of the guide wheel 250, a first portion of the guide wire 150 to be pulled into direct contact with the guide wheel 250, so that this first portion of the guide wire 150 will become wrapped around the guide wheel 250, and, at a second side of the guide wheel 250, a second portion of the guide wire 150 to be fed off of (e.g., no longer in direct contact with) the guide wheel 250, so that this second portion of the guide wire 150 is no longer wrapped around the guide wheel 250. The amount (e.g., length) of the guide wire 150 wrapped around the guide wheel 250 does not change upon rotation of the guide wheel 250, but the portion (e.g., the segment thereof, as measured along the length thereof) of the guide wire 150 that is wrapped around the guide wheel 250 changes at the guide wheel 250 is rotated by the transit motor 240. The guide wire 150 can be wrapped around the guide wheel 250 any desired and/or sufficient quantity of rotations. The rotation of the guide wheel 250 causes, as the guide wire 150 is drawn about and fed off of the guide wheel 250, a movement of the entire gantry 200 (e.g., as facilitated by rotation of the wheels 202 along the rails 114) in the direction of extension (e.g., the axial direction) of the guide wire 150.

The guide wire 150 is, as shown in at least FIGS. 9 and 10, secured at opposite longitudinal ends of the drying surface 110 by a fastener 152 and extends substantially coaxially with the longitudinal direction of the drying surface 110, so as to avoid inducing a cocking, or misalignment of the gantry 200 relative to the drying surface 200, which may cause a binding of rotation of the guide wheel 250 when the gantry 200 is adjacent to an end of the drying surface 110 from which the misalignment of the longitudinal axis of the guide wire 150 and the drying surface 110 originates. The guide wire 150 is shown being arranged so that the longitudinal axis thereof is centered about the drying surface 110, but may be laterally offset in some embodiments, in which case the longitudinal axis of the guide wire 150 and the longitudinal axis of the drying surface 110 may not be coaxial with each other, but are nevertheless substantially parallel to each other. The guide wire 150 is tensioned between the fastener 152 positioned at each end of the drying surface 110 to a sufficient degree to induce a friction between the surface of the guide wheel 250 and the portion of the guide wire 150 wrapped around the guide wheel 250, so as to prevent and/or resist slippage of the guide wheel 250 relative to the guide wire 150, in which case positional errors of the gantry along the drying surface 110 may be induced. In some embodiments, a rotary encoder may be provided in one or more of the wheels 202 to measure a rotary movement of the wheel 202 having such rotary encoder along the length of one of the rails 114; this may be advantageous because, since the wheels 202 are not driven, there should be none (e.g., only negligible) slippage between the wheels 202 and the rails 114. Multiple rotary encoders can be provided (e.g., one in each of multiple wheels 202) to guard against slippage of one wheel 202 along the rail 114 being undetected, such as may occur when a foreign object or other debris may be present on the rail 114 that causes a dragging of one of the wheels 202 along the rail 114 rather than a rotation of the wheel 202 along the rail 114. In some embodiments, the waste processing system 10 can comprise multiple guide wires 150 spaced apart from each other laterally across the drying surface and being substantially parallel to each other and the gantry 200 can have, attached to the frame 201, a corresponding (e.g., same) quantity of transit motors 240 and guide wheels 250 that each engage with one of the multiple guide wires 150 and operate in unison in substantially the same manner as described hereinabove. The use of multiple guide wires 150 and multiple guide wheel 250 and transit motor 240 assemblies can advantageously provide for redundant operations (e.g., so that the waste processing system 10 can remain operable upon failure of one or more of the transit motors 240, so long as at least one transit motor 240 remains operable).

The wet waste product 1 is advantageously applied in a thin layer, particularly in a layer that has a prescribed thickness (e.g., is less than or equal to about 0.5 inches). This prescribed thickness aids in formation of the convex shape of the "flakes" described elsewhere herein during the drying process of the wet waste product 1. While the dispenser 120 may be capable of extruding the waste product in a pattern having a thickness that is no more than 0.5 in. unaided, in the example embodiment disclosed herein the gantry 200 comprises a first agitator 210 (e.g., a trowel, brush, squeegee, flexible blade-like structure, substantially rigid blade-like structure, or the like), that is movably and/or pivotably attached to the frame 201 of the gantry 200, so as to be extendable towards the drying surface 110. As such, the dispenser 120 can dispense the wet waste product 1 over the drying surface 110 at a thickness that is greater than the prescribed thickness and the gantry 200 can lower the first agitator 210 to a prescribed height corresponding to the prescribed thickness of the wet waste product 1 on the drying surface 110 to level the wet waste product 1 at the prescribed thickness as the gantry 200 moves over the drying surface 110. The first agitator 210 is pivotably attached to the frame 201 and is rotatable around the pivot point by a first actuator 212 (e.g., a linear actuator). The controller 260 controls an extension and retraction of the first actuator 212 to control a rotary position of the first agitator 210 relative to the frame 201. The second agitator 220 is also, in some embodiments, pivotably attached to the frame 201 and is rotatable around the pivot point by a second actuator (e.g., a linear actuator). The controller 260 controls an extension and retraction of the second actuator to control a rotary position of the second agitator 220 relative to the frame 201. The second actuator may be the same type as, or different from, the first actuator 212. Thus, the gantry 200 moves both the dispenser 120 and the first agitator 210 along the drying surface 110 (e.g., in unison, or simultaneously) after and/or as the wet waste product 1 is extruded onto the drying surface 110 to form the wet waste product 1 on the drying surface 110 at the prescribed thickness. The gantry 200 can be provided with either DC or AC current and can be powered, in some embodiments, by solar panels 280 (see FIGS. 5, 6, and 8) and/or batteries 282 (see FIG. 8).

Continuing with particular reference to FIGS. 3-8, in some embodiments, the gantry 200 also comprises a second agitator 220, or texturizer. The second agitator 220 may be a trowel, brush, squeegee, flexible blade-like structure, substantially rigid blade-like structure, or the like. In some embodiments, the first and second agitators 210, 220 are each brushes comprised of individual bristles, which can be a same or different length, thickness, stiffness, and the like. As the exposed (e.g., top) surface of the wet waste product 1 dries due to the convective flow of ambient air thereover, it is advantageous to agitate and/or re-mix the wet waste product 1 on the drying surface one or more times during the drying process, such that the exposed surface of the wet waste product 1 remains moist to allow for enhanced convective moisture transfer, the efficacy of which can be reduced when the exposed surface is dried prior to the interior of the waste product being dried, in which case a film, crust, etc. may be formed that hinders convective moisture transfer. As such, the gantry 200 is configured to stir, or mix, the waste product during the drying process using the first and/or second agitators 210, 220. Thus, the first and/or second agitators 210, 220 are lowered to a height lower than the height of the exposed surface of the wet waste product 1, such that the first and/or second agitators 210, 220 contact and/or physically disturb the exposed surface of the wet waste product 1, such that the exposed surface of the wet waste product 1 is mixed with the internal contents of the wet waste product 1 to ensure that the exposed surface of the wet waste product 1 remains sufficiently moist to provide for effective moisture transfer via convection.

Figure 13:
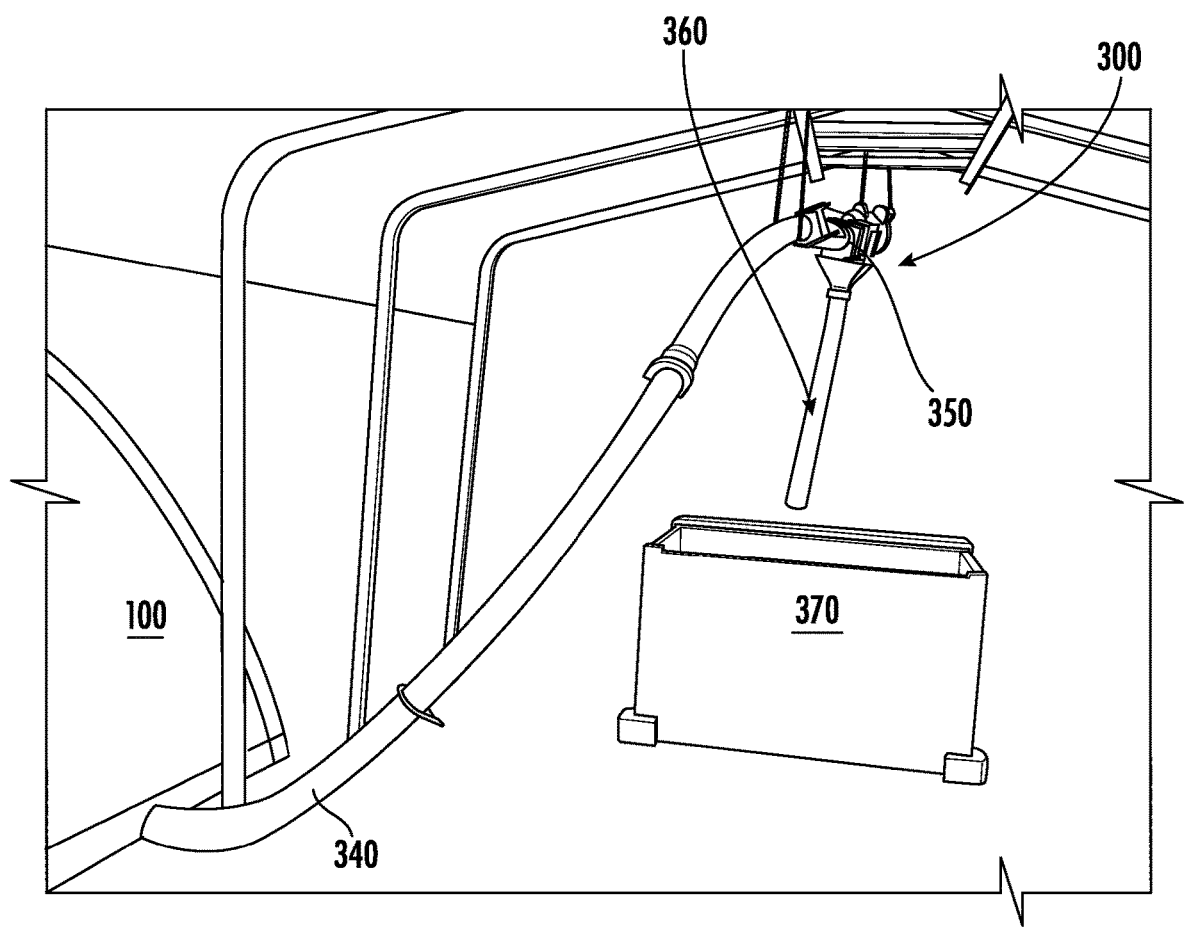
FIG. 13 is a perspective view in which further example aspects of the dried waste product transport system of FIG. 12 are shown.

After the wet waste product 1 on the drying surface 110 has been dried to a predetermined moisture content by the flow of ambient air (e.g., after the dried waste product 2 has been formed), the gantry 200 lowers the second agitator 220 to be in contact (e.g., direct contact) with the drying surface 110 and the gantry 200 moves along the drying surface 110 to accumulate the dried waste product 2. Then, the gantry 200 lowers the first agitator 210 adjacent to the drying surface 110 (e.g., in direct contact with, or spaced apart by less than a thickness of the "flakes" of the partially dried waste product formed during the drying process) to scrape the dried waste product 2 off of the drying surface 110 and into the trough 310 (see FIG. 12). In some embodiments, a ramp may be provided between the drying surface 110 and the trough 310 to facilitate transfer of the dried waste product 2 from the drying surface 110 into the trough 310. While, in the example embodiment shown, the collection area comprises a trough 310 arranged at a height below the drying surface 110, the collection area is not limited to only include such a trough and any suitable collection area for the collection of dried waste product 2 therein can be used that will allow for the transfer of the dried waste product 2 (e.g., by the first agitator 210) from the drying surface 110 into the collection area. In the example embodiment shown, the transfer of the dried waste product 2 from the drying surface 110 to the trough 310 is accomplished only using gravity. However, in some embodiments, the collection area can be a mobile repository and/or storage device and the dried waste product 2 can be transported from the drying surface 110 to the collection area by, for example, a conveyor or other suitable transport device. In the example embodiment shown, the trough 310 is advantageously contained within the enclosure 100 to prevent re-wetting of the dried waste product 2. Referring particularly to FIGS. 12 and 13, the example embodiment disclosed herein, a transport 320 is provided within the trough 310 and extending through the trough outlet 330, through the transport pipe 340, and is operably connected to a motor 350. The transport 320 is used to convey the dried waste product 2 substantially perpendicularly to a direction of travel of the gantry 200 along the drying surface 110 and out of the enclosure, through the transport pipe 340, and into an optional outlet pipe 360, which is attached to the motor 350 and configured for depositing the dried waste product 2 into the receptacle 370. In the example embodiment disclosed herein, the transport 320 is a stiffened centerless auger.

Thus, in the example embodiment shown, the waste processing system 10 comprises a dried waste transport system, generally designated 300, a portion of which is internal to the enclosure 100 and a portion of which is external to the enclosure 100. The dried waste transport system 300 comprises, in the example embodiment disclosed herein, the trough 310, the transport 320, the trough outlet 330, the transport pipe 340, the motor 350, the outlet pipe 360, and the receptacle 370. The transport 320 (e.g., the stiffened centerless auger) extends along an entire length of the transport pipes 340. As shown in FIG. 12, of the components of the dried waste transport system 300, the trough 310, the trough outlet 330, a first portion of the transport pipe 340 (e.g., the portion connected to the trough 310 at the trough outlet 330), and a first portion of the transport 320 (e.g., the portion within the trough 310 and the first portion of the transport pipe 340) are provided internal to the enclosure 100. As shown in FIG. 13, of the components of the dried waste transport system 300, a second portion of the transport pipes (e.g., the portion extending from the outer wall of the enclosure 100 to the motor 350), the motor 350, the outlet pipe 360, the receptacle 370, and a second portion of the transport (e.g., the portion contained within the second portion of the transport pipe 340) are provided external to the enclosure 100.

Referring again to the Figures, including in particular FIGS. 1, 3, 4, 7, 9 and 10, in order to control the duration of time necessary to achieve a prescribed moisture content in the dried waste product 2, the waste processing system 10 advantageously comprises one or more sensors 400 and a controller 260 in communication with the one or more sensors 400 to control a duration of drying of the wet waste product 1 on the drying surface before the dried waste product 2 is produced and transported to the trough 310 (see FIG. 12). In some embodiments, the one or more sensors 400 comprise a temperature sensor, which is configured to measure a temperature of the flow of ambient air at and/or through the AMD 130, and/or a moisture sensor, which is configured to measure a humidity or moisture content of the flow of ambient air at and/or through the AMD 130. In the example embodiment disclosed herein, the waste processing system 10 includes an interior temperature sensor, which measures a temperature of the air internal to (e.g., within the interior of) the enclosure 100, and an exterior temperature sensor, which measures a temperature of the ambient air external to the enclosure 100. Further sensors 400 can be provided as well, including, for example, an interior moisture sensor, which measures a humidity or moisture content of air internal to the enclosure 100, and an exterior moisture sensor, which measures a humidity or moisture content of the ambient air external to the enclosure 100. In some embodiments, a temperature sensor may be provided to measure the temperature at or on the floor (e.g., on the drying surface 110), since this temperature is correlated with the extent, or stage or progress, of drying of the wet waste product 1 (e.g., the moisture content of the wet waste product 1 during the drying process) and can be compared to the air temperature to determine the extent to which the wet waste product 1 has been dried, thereby allowing for enhanced control over the drying process in case the extent of drying is greater or less than the anticipated time, in which case the drying time can be increased or decreased accordingly to ensure that the wet waste product 1 is sufficiently dried to produce the dried waste product 2 having the predefined moisture content. In some embodiments, inputs from the sensors 400 are used to control the operation of the waste processing system 10 including the stirring of the wet waste product 1, operation of AMDs 130, and/or the timing of the scraping of the dried waste product 2 into the trough 2.

The controller 260 compares the temperature and/or humidity of the air internal to the enclosure 100 with the temperature and/or humidity of the ambient air external to the enclosure 100 to calculate the duration of the drying time for producing the dried waste product 2 from the wet waste product 1 after the wet waste product 1 has been dispensed on the drying surface 110.

A method for reducing moisture content of a waste product is also provided herein. In some or all embodiments, the method comprises steps of providing a drying surface; depositing, using a dispenser, the waste product onto the drying surface; inducing, using an air moving device (AMD), a flow of ambient air over the waste product on the drying surface to dry the waste product to a predetermined moisture content; moving, using an agitator, the waste product from the drying surface to a collection area after the waste product has been dried to the predetermined moisture content; and transporting the waste product away from the system.

In some or all embodiments of the method, the drying surface is substantially impermeable and/or is a rigid and/or non-deformable surface. For example, in some embodiments of the method the drying surface comprises concrete.

In the example embodiment disclosed herein, the method comprises providing an enclosure that covers the drying surface and the collection area to prevent re-wetting of the waste product by precipitation and channels the flow of ambient air from the AMD over the waste product on the drying surface. An example of a suitable enclosure is a greenhouse or other suitable structure, including both a temporary or permanent structure.

In some or all embodiments of the method, the AMD is one or more fans.

In some or all embodiments of the method, the AMD draws in the flow of ambient air from outside of the enclosure.

In some or all embodiments of the method, the flow of ambient air dries the waste product via evaporation.

In some or all embodiments, the method comprises providing dividers to channel the flow of ambient air primarily over the waste product on the drying surface.

In some or all embodiments of the method, the dispenser comprises an extruder, the method comprising dispensing, using the extruder, the waste product onto the drying surface.

In some or all embodiments of the method, the waste product supplied to the extruder has a solids content of between about 6% and about 15%, inclusive.

In some or all embodiments of the method, the extruder is attached to a moveable gantry, the method comprising moving, using the gantry, the extruder over the drying surface to dispense the waste product over the drying surface.

In some or all embodiments of the method, the extruder dispenses the waste product over substantially an entirety of the drying surface.

In some or all embodiments of the method, the gantry is a track-mounted and/or wheeled device.

In some or all embodiments of the method, the gantry comprises a first agitator and/or a second agitator.

In some or all embodiments of the method, the first agitator is movably and/or pivotably attached to the gantry, so as to be extendable towards the drying surface.

In some or all embodiments, the method comprises lowering the first agitator to a prescribed height corresponding to a prescribed thickness of the waste product on the drying surface; and moving the gantry along the drying surface after and/or as the waste product is extruded onto the drying surface to form the waste product on the drying surface at the prescribed thickness.

In some or all embodiments of the method, the prescribed thickness is less than or equal to about 0.5 inches, such that the waste product dries in a convex shape with a center thereof elevated from the drying surface to allow air circulation both above and below the center of the waste product during drying.

In some or all embodiments of the method, after the waste product has been dried to a predetermined moisture content by the flow of ambient air, the gantry lowers the second agitator in contact with the drying surface and moves along the drying surface to accumulate the waste product.

In some or all embodiments of the method, after the waste product has been dried to a predetermined moisture content by the flow of ambient air, the gantry lowers the first agitator adjacent to the drying surface and scrapes the waste product off of the drying surface and into the collection area.

In some or all embodiments of the method, the collection area comprises a trough at a height below the drying surface.

In some or all embodiments, the method comprises providing a transport within the trough; and conveying, using the transport, the waste product, after having been dried, substantially perpendicularly to a direction of travel of the gantry.

In some or all embodiments of the method, the transport comprises a stiffened centerless auger.

In some or all embodiments, the method comprises providing one or more sensors; providing a controller in communication with the one or more sensors; and controlling, using the controller, a duration of drying of the waste product on the drying surface before being transported to the collection area.

In some or all embodiments of the method, the one or more sensors comprise a temperature sensor, which measures a temperature of the flow of ambient air at an inlet of the AMD, and/or a moisture sensor, which measures a humidity, or moisture content, of the flow of ambient air at the inlet of the AMD.

In some or all embodiments of the method, the one or more sensors comprise an interior temperature sensor and an exterior temperature sensor and/or an interior moisture sensor and an exterior moisture sensor, the method comprising providing an enclosure that covers the drying surface and the collection area; measuring, using the interior temperature sensor, a temperature of air inside the enclosure and, using the exterior temperature sensor, a temperature of air outside the enclosure; and/or measuring, using the interior moisture sensor, a humidity, or moisture content, of air inside the enclosure and, using the exterior moisture sensor, a humidity, or moisture content, of air outside the enclosure.

In some or all embodiments, the method comprises comparing, using the controller, the temperature and/or humidity of the air inside the enclosure with the temperature and/or humidity of the air outside the enclosure to calculate the duration of the drying time for the waste product after having been dispensed on the drying surfaces.

In some embodiments, the presently disclosed subject matter provides a composition. In some embodiments, the presently disclosed subject matter provides a fertilizer composition. In some embodiments, the composition is produced by employing a method and/or using a system as disclosed herein to provide a starting material for the composition. However, any suitable approach to provide an animal waste starting material, such as a hog lagoon waste starting material, as would be apparent to one of ordinary skill in the art upon a review of the instant disclosure can be employed. In some embodiments, the presently disclosed composition comprises product characteristics, such as but not limited to fertilizer product characteristics, such as but not limited to nutrient content, size, hardness, durability and the like. Indeed, any suitable or desirable product characteristic as would be apparent to one of ordinary skill in the art upon a review of the presently disclosure is provided by a composition of the presently disclosed subject matter.

In some embodiments, the composition comprises a granular material having at least about bulk density of at least about 0.8 kg/L or at least about 50 lbs. per cubic foot. By way of elaboration and not limitation, in some embodiments, the presently disclosed subject matter provides a granulated lagoon sludge product. The lagoon sludge is dried and collected as disclosed herein to produce a starting material referred to herein after for convenience as "flakes". The flakes are ready for further processing. By way of example and not limitation, the flakes are first ground into a desired particle size, such as but not limited of about ⅟₁₆ of an inch in diameter or less in a suitable grinder, such as but not limited to a hammermill grinder.

This material is rewetted to a desired moisture content, such as but not limited to a moisture content (wet basis) ranging from about 40 to about 45% (water weight/(water weight+dry matter) including 40, 41, 42, 43, 44, or 45%. The material is mixed thoroughly. The re-wetted sludge is passed through a suitable mixer, such as a pin mixer, at a desired rotational speed, such as a rotational speed ranging from about 2,000 to about 3,000 RPM. In some embodiments, the rotational speed is about 2,000, 2,100, 2,200, 2,300, 2,400, 2,500, 2,600, 2,700, 2,800, 2,900, or 3,000 RPM. In some embodiments, the rotational speed is about 2,550 RPM. A criterion for selection of mixing speed is a speed that achieves a consistent product with the entirety of the material fully wetted.

The resulting moisture content after the pin mixer can range from about 37 to about 42%, such as about 40%, as the material heats and water evaporates as it passes through and granulates. In some embodiments, this finely granulated material is collected and passed through the pin mixer again at about ¼ the previous speed. This yields a granulated product that dries readily and is about 35-45% moisture content by weight with granules in the target range of 1 to about 3.2 mm in diameter, including about 2-2.8 mm in diameter. Thus, in some embodiments, the fertilizer composition has a moisture content ranging from about 37 to about 45% at an intermediate stage, including 37, 38, 39, 40, 41, 42, 43, 44, or 45%. In some embodiments, the fertilizer composition is subjected to further drying to provide a moisture content ranging from about 8 to about 15% as a final product, including 8, 9, 10, 11, 12, 13, 14, or 15%. By way of example and not limitation, this drying step can be carried out on a system comprising perforated belt, such as but not limited to a system as described by Published U.S. Patent No. US-2020-0271383-A1, published Aug. 27, 2020, herein incorporated by reference in its entirety. In some embodiments and as described herein below, after this material is dried it can be heat treated to achieve a temperature of 165 degrees Fahrenheit and a moisture content less than 12%, thus qualifying it for processed manure status for National Organic Program/OMRI non-restricted classification (NOP Reference Guidance 5006).

Fines can be used as a greens quality fertilizer while the overs are appropriate for slower release fertilizers. A faster speed of the pin mixer will yield a smaller diameter product and a slower speed will yield a larger diameter product. Thus, in some embodiments, the presently disclosed composition comprises granules ranging in diameter from about 1 mm to about 3.2 mm, including 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, and 3.2 mm. In some embodiments, the uniformity and/or spreadability of the fertilizer composition is/are evaluated using a suitable technique as would be apparent to one of ordinary skill in the art upon a review of the instant disclosure. For example, uniformity index (UI) and granulometric spread index (GSI) are evaluated as follows.

The UI of a product is a measurement of the relative difference in size between particles. The UI is calculated through the following equation: $(d_{95}/d_{10}) \times 100$, where $d_{95}$ is size of sieve opening that retains 95% of sample (smaller granule diameter), i.e., the amount of particles at or above this specific diameter; and $d_{10}$—size of sieve opening that retains 10% of sample (larger granule diameter) i.e., the amount of particles at or above this specific diameter. A UI between 40-60, inclusive, can be beneficial for fertilizer (the larger the number, the greater the uniformity), as this provides some indication that the particles are uniform, but different enough within the uniformity that they will spread efficiently and maximize storage or packing space. See feeco.com/physical-specifications-for-granular-fertilizer-and-soil-amendment-products.

Granulometric spread index (GSI) is another size parameter that is controlled in some embodiments of the presently disclosed subject matter. GSI quantifies how much variance exists between particles in a given sample. The lower the number, the more uniform the sample. GSI is calculated using the following equation: $((d_{84}-d_{16})/(2 \times d_{50})) \times 100$, where $d_{84}$ and $d_{16}$ are the diameter of mass fraction at the 84% and 16% percentile level, respectively and $d_{50}$ is median diameter of the sample. See feeco.com/physical-specifications-for-granular-fertilizer-and-soil-amendment-products.

In some embodiments, the composition is exposed to a heat treatment, such as but not limited to a heat treatment in an oven. By way of example and not limitation the heat treatment can range from about 160° F. to about 180° F., including about 170° F. In some embodiments, a suitable heat treatment is applied so that the composition achieves processed manure status for National Organic Program/OMRI non-restricted classification (NOP Reference Guidance 5006). This classification allows unrestricted use of the fertilizer with regard to crop harvest date, unlike unprocessed manures.

In some embodiments, the crush strength of this material averages at least about 4.9 lbs. per granule (by way of particular example and not limitation, about 4.9 lbs. for 2-2.8 mm diameter granules, about 5.3 lbs. for 2.8-3.2 mm granules. Thus, in some embodiments, it fits with the expectations for standard fertilizer hardness, i.e. about 4 to about 6 lbs. (https://feeco.com/physical-specifications-for-granular-fertilizer-and-soil-amendment-products/), including about 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, and/or about 6 lbs.

In an exemplary, non-limiting embodiment, the nutrient content of the fertilizer is 3.6, 12.7, 0.6 (NPK—percentage by weight in the composition) with 6.9% Ca and 1.2% Mg with 23.7% carbon. The expected fertilizer value based on surveys of lagoons in NC is 3.5, 16.3, 1.4 (NPK) with 6.5% Ca and 2.5% Mg with 26.7% carbon. Thus, in some embodiments, the presently disclosed subject matter provides a composition having the following profile (expressed as percent by weight in the composition): about 3 to about 4% nitrogen (N); about 10 to about 15% phosphorus (P); about 0.5 to about 1.5% potassium (K); about 6 to about 7% calcium (Ca); about 0.5 to about 3% magnesium (Mg); and/or about 20 to about 30% carbon (C).

In some embodiments, no binders or additives of any sort were used in the production of the composition. In some embodiments, the presently disclosed subject matter provides a composition comprising entirely processed animal waste. In some embodiments, carbon sequestration is also provided.

According to an example embodiment, a system for reducing moisture content of a waste product is provided, the system comprising: a drying surface; a dispenser configured to deposit the waste product onto the drying surface; an air moving device (AMD) configured to induce a flow of air over the waste product on the drying surface; a collection area configured to transport the waste product away from the system; and an agitator configured to move the waste product from the drying surface to the collection area after the waste product has been dried to a predetermined moisture content.

In some or all embodiments of the system, the drying surface is substantially impermeable.

In some or all embodiments of the system, the drying surface is a rigid surface and/or a non-deformable surface.

In some or all embodiments of the system, the drying surface comprises concrete.

In some or all embodiments, the system comprises an enclosure that covers the drying surface and the collection area, and is configured to prevent re-wetting of the waste product by precipitation and to channel the flow of air from the AMD over the waste product on the drying surface.

In some or all embodiments of the system, the enclosure comprises a greenhouse.

In some or all embodiments of the system, the AMD is one or more fans.

In some or all embodiments of the system, the AMD is configured to draw in the flow of air from outside of the enclosure.

In some or all embodiments of the system, the flow of air is configured to dry the waste product via evaporation.

In some or all embodiments, the system comprises dividers configured to channel the flow of air primarily over the waste product on the drying surface.

In some or all embodiments of the system, the dispenser comprises an extruder configured to dispense the waste product onto the drying surface.

In some or all embodiments of the system, the waste product supplied to the extruder has a solids content of between about 6% and about 15%, inclusive.

In some or all embodiments of the system, the extruder is attached to a moveable gantry configured to move the extruder over the drying surface to dispense the waste product over the drying surface.

In some or all embodiments of the system, the extruder is configured to dispense the waste product over substantially an entirety of the drying surface.

In some or all embodiments of the system, the gantry is a track-mounted and/or wheeled device.

In some or all embodiments of the system, the gantry comprises a first agitator and/or a second agitator.

In some or all embodiments of the system, the first agitator is movably and/or pivotably attached to the gantry, so as to be extendable towards the drying surface.

In some or all embodiments of the system, the gantry is configured to lower the first agitator to a prescribed height corresponding to a prescribed thickness of the waste product on the drying surface and to move along the drying surface after and/or as the waste product is extruded onto the drying surface to form the waste product on the drying surface at the prescribed thickness.

In some or all embodiments of the system, the prescribed thickness is less than or equal to about 0.5 inches, such that the waste product dries in a convex shape with a center thereof elevated from the drying surface to allow air circulation both above and below the center of the waste product during drying.

In some or all embodiments of the system, after the waste product has been dried to a predetermined moisture content by the flow of air, the gantry is configured to lower the second agitator in contact with the drying surface and to move along the drying surface to accumulate the waste product.

In some or all embodiments of the system, after the waste product has been dried to a predetermined moisture content by the flow of air, the gantry is configured to lower the first agitator adjacent to the drying surface to scrape the waste product off of the drying surface and into the collection area.

In some or all embodiments of the system, the collection area comprises a trough at a height below the drying surface.

In some or all embodiments, the system comprises a transport within the trough, the transport being configured to convey the waste product, after having been dried, substantially perpendicularly to a direction of travel of the gantry.

In some or all embodiments of the system, the transport comprises a stiffened centerless auger.

In some or all embodiments, the system comprises one or more sensors; and a controller configured to communicate with the one or more sensors to control a duration of drying of the waste product on the drying surface before being transported to the collection area.

In some or all embodiments of the system, the one or more sensors comprise a temperature sensor, which is configured to measure a temperature of the flow of air at an inlet of the AMD, and/or a moisture sensor, which is configured to measure a humidity, or moisture content, of the flow of air at the inlet of the AMD.

In some or all embodiments, the system comprises an enclosure that covers the drying surface and the collection area, wherein the one or more sensors comprise: an interior temperature sensor, which is configured to measure a temperature of air inside the enclosure, and an exterior temperature sensor, which is configured to measure a temperature of air outside the enclosure; and/or an interior moisture sensor, which is configured to measure a humidity, or moisture content, of air inside the enclosure, and an exterior moisture sensor, which is configured to measure a humidity, or moisture content, of air outside the enclosure.

In some or all embodiments of the system, the controller is configured to compare the temperature and/or humidity of the air inside the enclosure with the temperature and/or humidity of the air outside the enclosure to calculate the duration of the drying time for the waste product after having been dispensed on the drying surfaces.

According to another example aspect, a method for reducing moisture content of a waste product is provided, the method comprising: providing a drying surface; depositing, using a dispenser, the waste product onto the drying surface; inducing, using an air moving device (AMD), a flow of air over the waste product on the drying surface to dry the waste product to a predetermined moisture content; moving, using an agitator, the waste product from the drying surface to a collection area after the waste product has been dried to the predetermined moisture content; and transporting the waste product away from the system.

In some or all embodiments of the moisture-reduction method, the drying surface is substantially impermeable.

In some or all embodiments of the moisture-reduction method, the drying surface is a rigid surface and/or a non-deformable surface.

In some or all embodiments of the moisture-reduction method, the drying surface comprises concrete.

In some or all embodiments, the moisture-reduction method comprises providing an enclosure that covers the drying surface and the collection area to prevent re-wetting of the waste product by precipitation and channels the flow of air from the AMD over the waste product on the drying surface.

In some or all embodiments of the moisture-reduction method, the enclosure comprises a greenhouse.

In some or all embodiments of the moisture-reduction method, the AMD is one or more fans.

In some or all embodiments of the moisture-reduction method, the AMD draws in the flow of air from outside of the enclosure.

In some or all embodiments of the moisture-reduction method, the flow of air dries the waste product via evaporation.

In some or all embodiments, the moisture-reduction method comprises providing dividers to channel the flow of air primarily over the waste product on the drying surface.

In some or all embodiments of the moisture-reduction method, the dispenser comprises an extruder, the method comprising dispensing, using the extruder, the waste product onto the drying surface.

In some or all embodiments of the moisture-reduction method, the waste product supplied to the extruder has a solids content of between about 6% and about 15%, inclusive.

In some or all embodiments of the moisture-reduction method, the extruder is attached to a moveable gantry, the method comprising moving, using the gantry, the extruder over the drying surface to dispense the waste product over the drying surface.

In some or all embodiments of the moisture-reduction method, the extruder dispenses the waste product over substantially an entirety of the drying surface.

In some or all embodiments of the moisture-reduction method, the gantry is a track-mounted and/or wheeled device.

In some or all embodiments of the moisture-reduction method, the gantry comprises a first agitator and/or a second agitator.

In some or all embodiments of the moisture-reduction method, the first agitator is movably and/or pivotably attached to the gantry, so as to be extendable towards the drying surface.

In some or all embodiments, the moisture-reduction method comprises lowering the first agitator to a prescribed height corresponding to a prescribed thickness of the waste product on the drying surface; and moving the gantry along the drying surface after and/or as the waste product is extruded onto the drying surface to form the waste product on the drying surface at the prescribed thickness.

In some or all embodiments of the moisture-reduction method, the prescribed thickness is less than or equal to about 0.5 inches, such that the waste product dries in a convex shape with a center thereof elevated from the drying surface to allow air circulation both above and below the center of the waste product during drying.

In some or all embodiments of the moisture-reduction method, after the waste product has been dried to a predetermined moisture content by the flow of air, the gantry lowers the second agitator in contact with the drying surface and moves along the drying surface to accumulate the waste product.

In some or all embodiments of the moisture-reduction method, after the waste product has been dried to a predetermined moisture content by the flow of air, the gantry lowers the first agitator adjacent to the drying surface and scrapes the waste product off of the drying surface and into the collection area.

In some or all embodiments of the moisture-reduction method, the collection area comprises a trough at a height below the drying surface.

In some or all embodiments, the moisture-reduction method comprises providing a transport within the trough; and conveying, using the transport, the waste product, after having been dried, substantially perpendicularly to a direction of travel of the gantry.

In some or all embodiments of the method, the transport comprises a stiffened centerless auger.

In some or all embodiments, the moisture-reduction method comprises providing one or more sensors; providing a controller in communication with the one or more sensors; and controlling, using the controller, a duration of drying of the waste product on the drying surface before being transported to the collection area.

In some or all embodiments of the moisture-reduction method, the one or more sensors comprise a temperature sensor, which measures a temperature of the flow of air at an inlet of the AMD, and/or a moisture sensor, which measures a humidity, or moisture content, of the flow of air at the inlet of the AMD.

In some or all embodiments of the moisture-reduction method, the one or more sensors comprise an interior temperature sensor and an exterior temperature sensor and/or an interior moisture sensor and an exterior moisture sensor, the method comprising: providing an enclosure that covers the drying surface and the collection area; measuring, using the interior temperature sensor, a temperature of air inside the enclosure and, using the exterior temperature sensor, a temperature of air outside the enclosure; and/or measuring, using the interior moisture sensor, a humidity, or moisture content, of air inside the enclosure and, using the exterior moisture sensor, a humidity, or moisture content, of air outside the enclosure.

In some or all embodiments, the moisture-reduction method comprises comparing, using the controller, the temperature and/or humidity of the air inside the enclosure with the temperature and/or humidity of the air outside the enclosure to calculate the duration of the drying time for the waste product after having been dispensed on the drying surfaces.

According to another example embodiment, a composition is provided. In some or all embodiments, the composition being produced by any method disclosed herein.

According to another example embodiment, a fertilizer composition is provided, the fertilizer composition comprising a granular animal waste product having at least about bulk density of at least about 0.8 kg/L or at least about 50 lbs. per cubic foot.

In some or all embodiments of the fertilizer composition, the animal waste product is derived from hog lagoon sludge, optionally a dried hog lagoon sludge, optionally a dried hog lagoon sludge originating from North Carolina.

In some or all embodiments of the fertilizer composition, the animal waste product has a solids content of between about 4% and about 25% upon initial isolation.

In some or all embodiments of the fertilizer composition, the fertilizer composition has a moisture content ranging from about 37 to about 45% at an intermediate stage and/or has a moisture content ranging from about 8 to about 15% as a final product.

In some or all embodiments, the fertilizer composition comprises granules ranging in diameter from about 1 mm to about 3.2 mm.

In some or all embodiments of the fertilizer composition, the composition comprises granules having a crush strength ranging from about 4 to about 6 lbs.

In some or all embodiments, the fertilizer composition comprises about 3 to about 4% nitrogen (N); about 10 to about 15% phosphorus (P); about 0.5 to about 1.5% potassium (K); about 6 to about 7% calcium (Ca); about 0.5 to about 3% magnesium (Mg); and/or about 20 to about 30% carbon (C).

In some or all embodiments of the fertilizer composition, the composition is free of a binder and/or an additive.

In some or all embodiments of the fertilizer composition, the composition comprises entirely processed animal waste.

According to another example embodiment, a method of making a fertilizer composition is provided. In some or all embodiments, the method comprises providing a dried animal waste starting material; grinding the animal waste starting material; re-wetting the ground animal waste starting material; mixing the re-wetted material; and drying the re-wetted material.

In some or all embodiments of the fertilizer composition-making method, the animal waste product is derived from hog lagoon sludge, optionally a dried hog lagoon sludge, optionally a dried hog lagoon sludge originating from North Carolina.

In some or all embodiments of the fertilizer composition making method, the animal waste product has a solids content of between about 4% and about 25% upon initial isolation.

In some or all embodiments of the fertilizer composition-making method, grinding the animal waste product into a desired particle size, optionally a particle size of about 1/16 of an inch or less, further optionally wherein the grinder is accomplished in a hammermill grinder.

In some or all embodiments of the fertilizer composition-making method, the animal waste material is rewetted to a moisture content ranging from about 40 to about 45%.

In some or all embodiments of the fertilizer composition-making method, the mixing is carried out at a rotational speed ranging from about 2,000 to about 3,000 RPM, optionally in a pin mixer.

In some or all embodiments of the fertilizer composition-making method, the resulting moisture content after mixing ranges from about 37 to about 42%.

In some or all embodiments, the fertilizer composition-making method comprises mixing again about a speed of about ¼ the previous speed.

In some or all embodiments, the fertilizer composition-making method comprises exposing the composition is exposed to a heat treatment, optionally wherein the heat treatment ranges from about 160° F. to about 180° F.

According to another example embodiment, a fertilizer composition is provided. In some or all embodiments, the fertilizer composition is produced by any method disclosed herein.

In some or all embodiments, the fertilizer composition comprises a granular animal waste product having at least about bulk density of at least about 0.8 kg/L or at least about 50 lbs. per cubic foot.

In some or all embodiments of the fertilizer composition, the fertilizer composition has a moisture content ranging from about 37 to about 45% at an intermediate stage and/or has a moisture content ranging from about 8 to about 15% as a final product.

In some or all embodiments, the fertilizer composition comprises granules ranging in diameter from about 1 mm to about 3.2 mm.

In some or all embodiments of the fertilizer composition, the composition comprises granules having a crush strength ranging from about 4 to about 6 lbs.

In some or all embodiments, the fertilizer composition comprises about 3 to about 4% nitrogen (N); about 10 to about 15% phosphorus (P); about 0.5 to about 1.5% potassium (K); about 6 to about 7% calcium (Ca); about 0.5 to about 3% magnesium (Mg); and/or about 20 to about 30% carbon (C).

While the systems, compositions, and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures, components, ingredients, and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for reducing moisture content of a wet waste product, the system comprising:
   a drying surface;
   a dispenser configured to deposit the wet waste product onto the drying surface;
   an air moving device (AMD) configured to induce a flow of ambient air over the wet waste product on the drying surface to produce a dried waste product from the wet waste product;
   a collection area configured to transport the dried waste product away from the drying surface; and an agitator configured to move the dried waste product from the drying surface to the collection area after the dried waste product has been dried to have a predetermined moisture content.

2. The system of claim 1, wherein:
the drying surface is substantially impermeable; and/or
the drying surface is a rigid surface and/or a non-deformable surface; and/or
the drying surface comprises concrete.

3. The system of claim 1, comprising an enclosure that is arranged to cover and substantially fully enclose an area around and including the drying surface and the collection area;
wherein the enclosure is configured to prevent re-wetting of the dried waste product by precipitation and to channel the flow of ambient air from the AMD over the wet waste product on the drying surface.

4. The system of claim 3, wherein the AMD is one or more fans configured to draw in the flow of ambient air from outside of the enclosure to dry the wet waste product via evaporation.

5. The system of claim 4, comprising dividers arranged within the enclosure to channel a majority of the flow of ambient air over the wet waste product on the drying surface.

6. The system of claim 1, wherein the dispenser comprises an extruder configured to dispense the wet waste product onto the drying surface.

7. The system of claim 6, wherein the extruder is attached to a moveable gantry configured to move the extruder over the drying surface to dispense the wet waste product over some or all of the drying surface.

8. The system of claim 7, wherein the gantry is a track-mounted and/or wheeled device that comprises a first agitator and/or a second agitator.

9. The system of claim 8, wherein:
the first agitator is movably and/or pivotably attached to the gantry, for extension of the first agitator in a direction of the drying surface;
the gantry is configured to lower the first agitator to a prescribed height corresponding to a prescribed thickness of the wet waste product on the drying surface and to move along the drying surface after and/or as the wet waste product is extruded onto the drying surface to form the wet waste product on the drying surface at the prescribed thickness;
the prescribed thickness is less than or equal to about 0.5 inches, such that the wet waste product dries in a convex shape with a center thereof elevated from the drying surface to allow air circulation both above and below the center of the wet waste product during drying; and
after the dried waste product having the predetermined moisture content has been produced by the flow of ambient air, the gantry is configured to:
lower the second agitator in contact with the drying surface and to move along the drying surface to accumulate the dried waste product; and/or
lower the first agitator adjacent to the drying surface to scrape the dried waste product off of the drying surface and into the collection area.

10. The system of claim 9, wherein the collection area comprises a trough at a height below the drying surface.

11. The system of claim 10, comprising a transport in a form of a stiffened centerless auger within the trough, the transport being configured to convey the dried waste product substantially perpendicularly to a direction of travel of the gantry along the drying surface.

12. The system of claim 1, comprising:
one or more sensors; and
a controller configured to communicate with the one or more sensors to control a duration of drying of the wet waste product on the drying surface before being transported to the collection area.

13. The system of claim 12, wherein the one or more sensors comprise a temperature sensor, which is configured to measure a temperature of the flow of ambient air at and/or through the AMD, and/or a moisture sensor, which is configured to measure a humidity or moisture content of the flow of ambient air at and/or through the AMD.

14. The system of claim 13, comprising an enclosure that covers the drying surface and the collection area, wherein the one or more sensors comprise:
an interior temperature sensor, which is configured to measure a temperature of air inside the enclosure, and an exterior temperature sensor, which is configured to measure a temperature of the ambient air outside the enclosure; and/or
an interior moisture sensor, which is configured to measure a humidity or moisture content of air inside the enclosure, and an exterior moisture sensor, which is configured to measure a humidity or moisture content of the ambient air outside the enclosure;
wherein the controller is configured to compare the temperature and/or humidity of the air inside the enclosure with the temperature and/or humidity of the air outside the enclosure to calculate the duration of the drying time for the wet waste product after having been dispensed on the drying surfaces.

15. A method for reducing moisture content of a wet waste product, the method comprising:
providing a drying surface;
depositing, using a dispenser, the wet waste product onto the drying surface;
inducing, using an air moving device (AMD), a flow of ambient air over the wet waste product on the drying surface to produce a dried waste product having a predetermined moisture content from the wet waste product;
moving, using an agitator, the dried waste product from the drying surface to a collection area after the dried waste product has been determined to have the predetermined moisture content; and
transporting the waste product out of the collection area.

16. The method of claim 15, wherein:
the drying surface is substantially impermeable; and/or
the drying surface is a rigid surface and/or a non-deformable surface; and/or
the drying surface comprises concrete.

17. The method of claim 15, comprising arranging an enclosure to cover and substantially fully enclose an area around and including the drying surface and the collection area;
wherein the enclosure prevents re-wetting of the dried waste product by precipitation and channels the flow of ambient air from the AMD over the dried waste product on the drying surface.

18. The method of claim 17, wherein the AMD is one or more fans that draw in the flow of ambient air from outside of the enclosure to dry the wet waste product via evaporation.

19. The method of claim 18, comprising arranging dividers within the enclosure to channel a majority of the flow of ambient air over the wet waste product on the drying surface.

20. The method of claim 15, wherein the dispenser comprises an extruder, the method comprising dispensing, using the extruder, the wet waste product onto the drying surface.

21. The method of claim 20, wherein the extruder is attached to a moveable gantry, the method comprising moving, using the gantry, the extruder over the drying surface to dispense the wet waste product over some or all of the drying surface.

22. The method of claim 21, wherein the gantry is a track-mounted and/or wheeled device that comprises a first agitator and/or a second agitator.

23. The method of claim 22, comprising:
movably and/or pivotably attaching the first agitator to the gantry for extension of the first agitator in a direction of the drying surface;
lowering the first agitator to a prescribed height corresponding to a prescribed thickness of the wet waste product on the drying surface;
moving the gantry along the drying surface after and/or as the wet waste product is extruded onto the drying surface to form the wet waste product on the drying surface at the prescribed thickness, wherein the prescribed thickness is less than or equal to about 0.5 inches, such that the wet waste product dries in a convex shape with a center thereof elevated from the drying surface to allow air circulation both above and below the center of the wet waste product during drying; and
after the dried waste product having the predetermined moisture content has been produced by the flow of ambient air, using the gantry to:
lower the second agitator in contact with the drying surface and to move along the drying surface to accumulate the dried waste product; and/or
lower the first agitator adjacent to the drying surface to scrape the dried waste product off of the drying surface and into the collection area.

24. The method of claim 23, wherein the collection area comprises a trough at a height below the drying surface.

25. The method of claim 24, comprising transporting, using a transport in a form of a stiffened centerless auger within the trough, the dried waste product substantially perpendicularly to a direction of travel of the gantry along the drying surface.

26. The method of claim 15, comprising:
providing one or more sensors;
providing a controller in communication with the one or more sensors; and
controlling, using the controller, a duration of drying of the wet waste product on the drying surface before being transported to the collection area.

27. The method of claim 26, wherein the one or more sensors comprise a temperature sensor, which is used to measure a temperature of the flow of ambient air at and/or through the AMD, and/or a moisture sensor, which is used to measure a humidity or moisture content of the flow of ambient air at and/or through the AMD.

28. The method of claim 27, wherein the one or more sensors comprise an interior temperature sensor and an exterior temperature sensor and/or an interior moisture sensor and an exterior moisture sensor, the method comprising:
arranging an enclosure to cover and substantially fully enclose an area around and including the drying surface and the collection area;
measuring, using the interior temperature sensor, a temperature of air inside the enclosure and, using the exterior temperature sensor, a temperature of air outside the enclosure; and/or
measuring, using the interior moisture sensor, a humidity, or moisture content, of air inside the enclosure and, using the exterior moisture sensor, a humidity, or moisture content, of air outside the enclosure; and
comparing, using the controller, the temperature and/or humidity of the air inside the enclosure with the temperature and/or humidity of the ambient air outside the enclosure to calculate the duration of the drying time for the wet waste product after having been dispensed on the drying surfaces.

* * * * *